United States Patent
Kim et al.

(10) Patent No.: US 10,300,477 B2
(45) Date of Patent: May 28, 2019

(54) TERMINALLY-CROSSLINKED METHYL MORPHOLINIUM-FUNCTIONALIZED BLOCK COPOLYMERS, AND ANION EXCHANGE MEMBRANES USING THE SAME

(71) Applicant: INCHEON UNIVERSITY INDUSTRY ACADEMIC COOPERATION FOUNDATION, Incheon (KR)

(72) Inventors: Tae Hyun Kim, Incheon (KR); So Hyun Kwon, Incheon (KR)

(73) Assignee: INCHEON UNIVERSITY INDUSTRY ACADEMIC COOPERATION FOUNDATION, Incheon (KR)

( * ) Notice: Subject to any disclaimer, the term of this patent is extended or adjusted under 35 U.S.C. 154(b) by 0 days.

(21) Appl. No.: 15/694,980

(22) Filed: Sep. 4, 2017

(65) Prior Publication Data
US 2018/0345269 A1    Dec. 6, 2018

(30) Foreign Application Priority Data

Jun. 1, 2017    (KR) .................. 10-2017-0068249

(51) Int. Cl.
*C08G 75/23*    (2006.01)
*B01J 41/13*    (2017.01)
(Continued)

(52) U.S. Cl.
CPC .......... *B01J 41/13* (2017.01); *B01D 67/0006* (2013.01); *B01D 71/80* (2013.01); *B01D 71/82* (2013.01);
(Continued)

(58) Field of Classification Search
CPC ........................... C08G 81/00; C08G 75/0245
See application file for complete search history.

(56) References Cited

FOREIGN PATENT DOCUMENTS

KR    10-1039089 B1    5/2011

OTHER PUBLICATIONS

Hahn, S.J.; Won, M.; Kim, T.H. A morpholinium-functionalized poly(ether sulfone) as a novel anion exchange membrane for alkaline fuel cell Polym. Bull. (2013) 70:3373-3385 (Year: 2013).*

(Continued)

*Primary Examiner* — Michael M Dollinger
*Assistant Examiner* — Christina H.W. Rosebach
(74) *Attorney, Agent, or Firm* — Revolution IP, PLLC

(57) ABSTRACT

The present disclosure herein relates to a terminally-crosslinked methyl morpholinium-functionalized block copolymer, and an anion exchange membrane using the same, and more particularly, to a terminally-crosslinked block copolymer which has a novel structure, and in which, in a poly(arylene ether sulfone) multiblock copolymer (MM-PES) having methyl morpholinium as a conducting group, an azide compound may be used as a crosslinking agent so that crosslinking only occurs at ends of the polymer chains (xMM-PES), thereby minimizing conductivity loss, significantly increasing mechanical and chemical stability, attaining additional conductivity resulting from the three-dimensional structure of morpholinium, and reducing water uptake while enhancing water retention capacity, uses thereof as an alkaline fuel cell anion exchange membrane (AEM), and a method for conveniently preparing the same through simple heat-treatment.

13 Claims, 15 Drawing Sheets

(51) Int. Cl.
  *B01J 47/12* (2017.01)
  *C08J 5/22* (2006.01)
  *C08G 75/0245* (2016.01)
  *C08G 81/00* (2006.01)
  *B29C 71/02* (2006.01)
  *C08J 3/24* (2006.01)
  *C08J 7/12* (2006.01)
  *H01M 8/1027* (2016.01)
  *H01M 8/1081* (2016.01)
  *B01D 71/80* (2006.01)
  *B01D 67/00* (2006.01)
  *B01J 41/04* (2017.01)
  *C08G 65/40* (2006.01)
  *B01D 71/82* (2006.01)
  *B01D 61/42* (2006.01)
  *B01D 71/68* (2006.01)

(52) U.S. Cl.
  CPC .............. *B01J 41/04* (2013.01); *B01J 47/12* (2013.01); *C08G 65/4056* (2013.01); *C08G 75/0245* (2013.01); *C08G 75/23* (2013.01); *C08G 81/00* (2013.01); *C08J 3/247* (2013.01); *C08J 5/2262* (2013.01); *C08J 7/08* (2013.01); *C08J 7/12* (2013.01); *H01M 8/1027* (2013.01); *H01M 8/1081* (2013.01); *B01D 61/422* (2013.01); *B01D 71/68* (2013.01); *B01D 2323/30* (2013.01); *C08G 2340/00* (2013.01); *C08J 2381/02* (2013.01)

(56) References Cited

OTHER PUBLICATIONS

Oh, Y.S.; Lee, H.J.; Yoo, M.; Kim, H.J.; Han, J.; Kim, K.; Hong, J.D.; Kim, T.H. Azide-assisted cross-linked sulfonated poly(ether sulfone)s as stable and highly conductive membranes with low methanol diffusion coefficients. Chem. Commun., 2008, 2028-2030 (Year: 2008).*

Figures from KR 1545229 by Kim. Accessed via Derwent. Originally published Jun. 8, 2015 (Year: 2015).*

Derwent Abstract, KR 1545229 by Kim. Accessed via Derwent. Originally published Jun. 8, 2015 (Year: 2015).*

* cited by examiner (a) OH-PES (b) allyl-PES (c) allyl-MM-PES

Non-crosslinked membranes

Terminally-crosslinked membranes

TERMINALLY-CROSSLINKED METHYL MORPHOLINIUM-FUNCTIONALIZED BLOCK COPOLYMERS, AND ANION EXCHANGE MEMBRANES USING THE SAME

BACKGROUND

The present disclosure herein relates to a terminally-crosslinked methyl morpholinium-functionalized block copolymer, and an anion exchange membrane using the same, and more particularly, to a terminally-crosslinked block copolymer which has a novel structure, and in which, in a poly(arylene ether sulfone) multiblock copolymer (MM-PES) having methyl morpholinium as a conducting group, an azide compound may be used as a crosslinking agent so that crosslinking only occurs at ends of the polymer chains (xMM-PES), thereby minimizing conductivity loss, significantly increasing mechanical and chemical stability, attaining additional conductivity resulting from the three-dimensional structure of morpholinium, and reducing water uptake while enhancing water retention capacity; uses thereof as an alkaline fuel cell anion exchange membrane (AEM); and a method for conveniently preparing the same through simple heat-treatment.

Anion exchange membranes (AEMs), due to the possibility of application to electrochemical energy conversion/storage devices, such as fuel cells, electrodialysis cells, and redox flow cells, has received significant attention over the past 10 years. When AEMs are used in such devices, costs may be reduced because non-noble metal catalysts may be used through operation in alkaline conditions.

However, the poor stability of AEMs in highly alkaline (high pH) operating conditions, particularly at high temperatures (>80° C.), is limiting the successful adoption of such techniques.

Accordingly, there has been much effort in recent years focusing on improving the chemical stability of polymer backbones and anionic (OH⁻) conducting groups in AEMs. Various polymer backbone structures, including poly(arylene ether sulfone), poly(phenylene oxide), poly(olefin), poly(styrene), and poly(phenylene), have been examined as AEMs.

However, there is not yet a consensus of opinions on what is the most promising polymer structure.

Crosslinking enhances the alkaline stability of AEM polymer backbones, and thus may be an efficient method for achieving long-term stability in a membrane.

However, most crosslinking systems necessarily entail a reduction in ionic conductivity because the formation of a rigid 3D-network and the resulting low water uptake suppresses ionic conduction in crosslinking networks.

Accordingly, several different approaches have been attempted, such as blending or ionic conductor-mediated crosslinking Meanwhile, various research is being carried out to improve the alkaline stability of AEM conductive groups. Cations, including the most typically used quaternary ammonium (QA), may be introduced into AEMs, and examples thereof may include imidazolium, guanidinium, phosphonium, sulfonium, and metal-based hybrid cations and the like.

Recently, aliphatic heterocyclic QA cationic head groups such as piperidinium and morpholinium have been considered the most stable due to such aliphatic heterocyclic QA cationic head groups having bulky structures, and such bulky structures impede the approach of OH⁻ to polymers connected with anion-conductive groups.

Another advantage of such conductors is enhanced ionic conductivity, which is due to the high ionic dissociation properties of the conductors resulting from the bulky structures thereof.

Therefore, polymers functionalized by n-methyl piperidinium and n-methyl morpholinium may exhibit excellent alkaline stability and high OH⁻ conductivity.

The present inventors have developed a terminally-crosslinked sulfonated ionomer (ion-conductive polymer) using an azide as a proton exchange membrane. Unlike most crosslinked polymer systems, such sulfonated ionomers are were only crosslinked at polymer chain ends.

A membrane manufactured from a terminally-crosslinked sulfonated poly(arylene ether sulfone) (sPES) was able to minimize conductivity loss following crosslinking by minimizing the formation of a 3-D crosslinking network, and most of the structural perfection was maintained.

Moreover, such a terminally-crosslinked membrane exhibited particularly high proton conductivity, in particular under high temperature and/or partially hydrated relative humidity (RH) conditions. This can be explained by the formation of a unique terminally-crosslinked system in which more water is trapped inside a 3-D network due to structural reorganization of a polymer backbone induced by hydrothermal energy.

PRIOR ART DOCUMENT

Patent Document (Patent document 1) Korean Patent No. 10-1039089

SUMMARY

The inventive concept is for fulfilling the typical requirements such as described above, and a technical object thereof is to provide, for the first time ever, a terminally-crosslinked methyl morpholinium-functionalized poly(arylene ether sulfone) (xMM-PES) that combines the advantages of a bulky morpholinium conductor and a unique terminally-crosslinked polymer network; and a novel AEM using the same.

Crosslinked membranes prepared from xMM-PESs exhibited excellent thermal, mechanical, and chemical stability, along with high ionic conductivity, and in particular, such advantages were clearly achieved under high temperature and partially hydrated relative humidity (RH) conditions.

Moreover, the present inventors rigorously examined the effects of crosslinking on the morphology, physical properties, ionic conductivity, and alkaline stability of a polymer membrane.

Therefore, the inventive concept offers the first ever example in which terminal crosslinking is applied to poly(arylene ether sulfone) having a bulky morpholinium as a conductor, and in which the terminally-crosslinked poly(arylene ether sulfone) as used as an anion exchange membrane.

To achieve the technical objectives described above, the inventive concept provides a terminally-crosslinked polymer membrane characterized by being a polymer membrane (xMM-PES) obtained by crosslinking a methyl morpholinium-functionalized multiblock copolymer (MM-PES) represented by Formula 5 below, wherein the MM-PES is crosslinked by an azide compound crosslinking agent represented by Formula 6 below; and the crosslinking only occurs at ends of the MM-PES polymer chain.

[Formula 5]

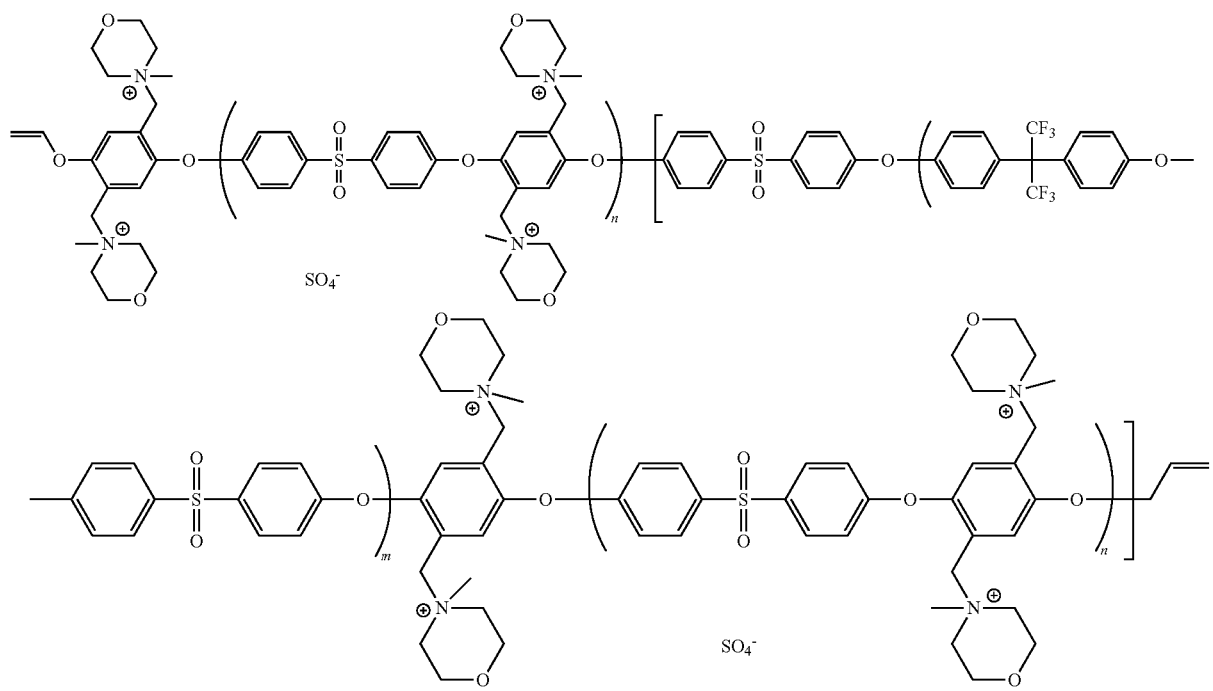

(In Formula 5 above, n and m, as repeating units of the multiblock copolymer, are integers, and n:m is in the range of 1:1.5-1.5:1.)

[Formula 6]

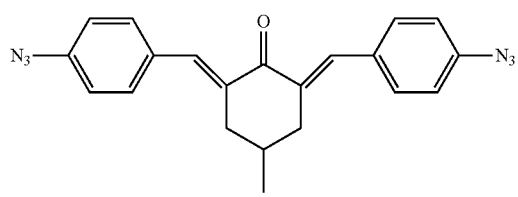

AEMFCs (anion exchange membrane fuel cells) are being realized as desirable alternatives for PEMFCs. AEMs are the most important component of AEMFCs, and thus require high ionic conductivity and excellent dimensional, mechanical, and alkaline stability. However, high conductivity is usually accompanied by poor dimensional and mechanical stability.

In order to overcome such limitations, there have been attempts to chemically crosslink polymers, but crosslinking increases the hydrophobicity of the crosslinked membrane, and thus inevitably causes conductivity loss.

Accordingly, in the inventive concept, a terminally-crosslinked polymer membrane of a novel structure was developed, wherein, due to crosslinking being limited to ends of the polymer chain, the terminally-crosslinked polymer membrane is capable of achieving excellent physical and chemical stability while minimizing conductivity loss.

In the inventive concept, methyl morpholinium in the xMM-PES acts as a conducting group. The inventive concept has the advantage in which, due to the three-dimensional structure of such morpholinium, excellent conductivity may be additionally gained.

In an exemplary embodiment, the xMM-PES may have a highly hydrophilic composition in which n:m is 1.5:1.

In the case of such a highly hydrophilic composition crosslinked membrane (xMM-PES-1.5-1), a high ionic conductivity of 73.4 mS/cm and a low water uptake of 26.1% was obtained at 80° C. Moreover, due to the enhanced water retention capacity resulting from the terminally-crosslinked structure, a higher conductivity was exhibited than the non-crosslinked membrane (MM-PES-1.5-1) at temperature conditions above 60° C.

The azide compound crosslinking agent may be used in an amount of about 10-20 wt % (for example, an amount of 15 wt %) based on the weight of the MM-PES.

The weight average molecular weight ($M_w$) of xMM-PES which is crosslinked in this manner using an azide compound crosslinking agent as an intermediary may be on the level of 1,000-100,000, but is not limited thereto.

A terminally-crosslinked polymer membrane according to the inventive concept may be very appropriately used as an anion exchange membrane (AEM), in particular, an anion exchange membrane (AEM) in an alkaline fuel cell.

Moreover, the terminally-crosslinked polymer membrane may also be widely applied as an element in the field of water treatment, including electrodialysis and water purification filters and the like.

According to another aspect of the inventive concept, a method for preparing the terminally-crosslinked polymer membrane (xMM-PES) is provided, the method being characterized in that, after a solution is obtained by mixing a methyl morpholinium-functionalized poly(arylene ether sulfone) multiblock copolymer (MM-PES) represented by Formula 5 below and an azide compound crosslinking agent represented by Formula 6 below in a solvent, the obtained solution is cast into a film form and dried, and then the dried film is heat-treated to cross-link the polymer.

[Formula 5]

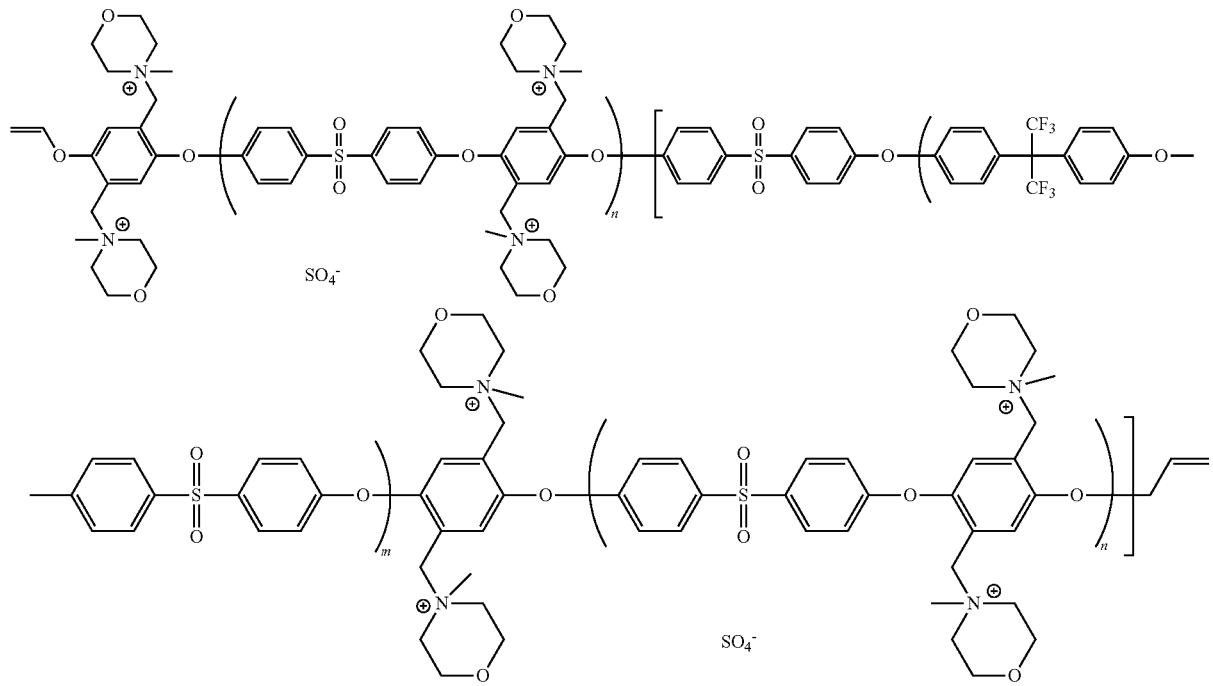

(In Formula 5 above, n:m=1:1.5 to 1.5:1).

[Formula 6]

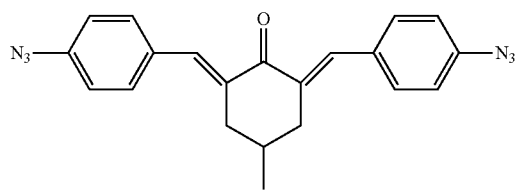

That is, the terminally-crosslinked polymer membrane of the inventive concept may be synthesized by a simple heat treatment, and it was confirmed through experiments that terminally-crosslinked xMM-PESs having different hydrophilic-hydrophobic compositions were successfully prepared by thermal crosslinking using an azide.

In the preparation method of the inventive concept, dimethylformamide (DMF) may be used as the solvent, but the solvent is not limited thereto.

The heat treatment may be performed at 170-200° C., and desirably, heat treatment is performed for a predetermined amount of time at 180° C. Through such heat treatment, crosslinking that interconnects MM-PES proceeds as $N_2$ is excluded from $N_3$ at both ends of the azide compound, which is the crosslinking agent.

Moreover, in some cases, instead of heat treatment, a UV treatment capable of carrying out the same crosslinking action may be performed.

DETAILED DESCRIPTION

Figure 1:
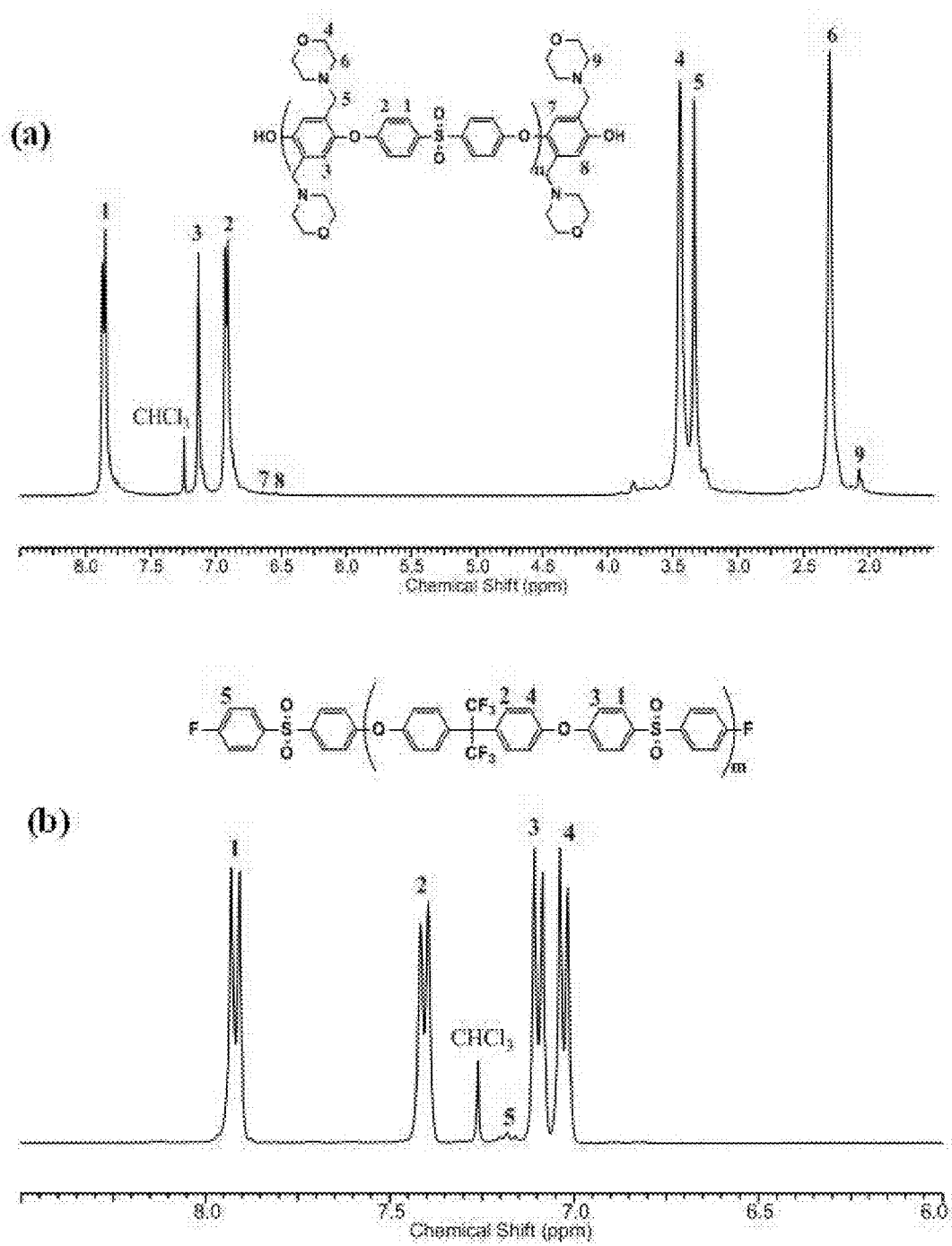
FIG. 1 displays $^1$H NMR spectra of (a) OH-terminated oligomer 1; and (b) F-terminated oligomer 2 in $CDCl_3$.

Hereinafter, the inventive concept is described in greater detail through examples and experimental examples. However, said examples are merely for assisting in the understanding of the inventive concept, and the scope of the inventive concept is not in any way limited to said examples.

EXAMPLES (1) Synthesis of Methyl Morpholinium-Functionalized Poly(Arylene Ether Sulfone) Multiblock Copolymer Having Terminally-Crosslinking Group Methyl morpholinium-functionalized multiblock poly(arylene ether sulfone) 5 having a terminal aryl as a crosslinking group was prepared as illustrated in Drawing 1.

First, morpholine-containing OH-terminated oligomer 1 having repeating units 11 and 12 was prepared by condensation polymerization between M-OH and FPS (Drawing 2).

F-terminated oligomer 2 having repeating unit 13 was synthesized in a similar manner by reaction between 6-FBPA and FPS monomer (Drawing 2).

The number of repeating units in each oligomer (1 and 2) was controlled by monomer equivalent.

The supply ratios of M-OH monomer and FPS monomer were each controlled to target a repeating unit number (n) of 21 for OH-terminated oligomer 1 and a repeating unit number (m) of 13 for F-terminated oligomer 2.

[Drawing 1] Synthesis pathways for terminally-crosslinked methyl morpholinium-functionalized poly(arylene ether sulfone) block copolymer membrane (xMM-PES) and non-crosslinked membrane (MM-PES)

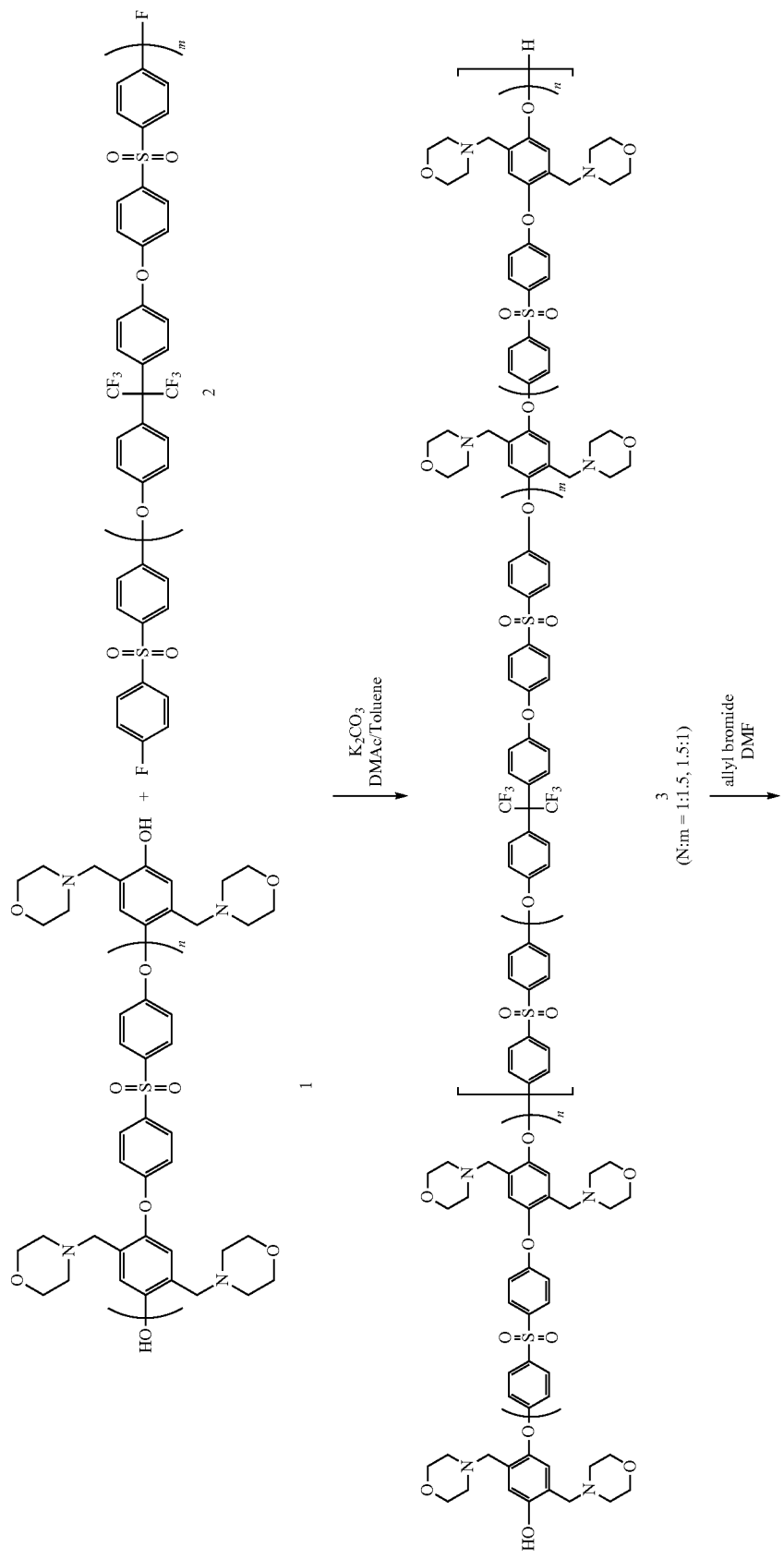

-continued
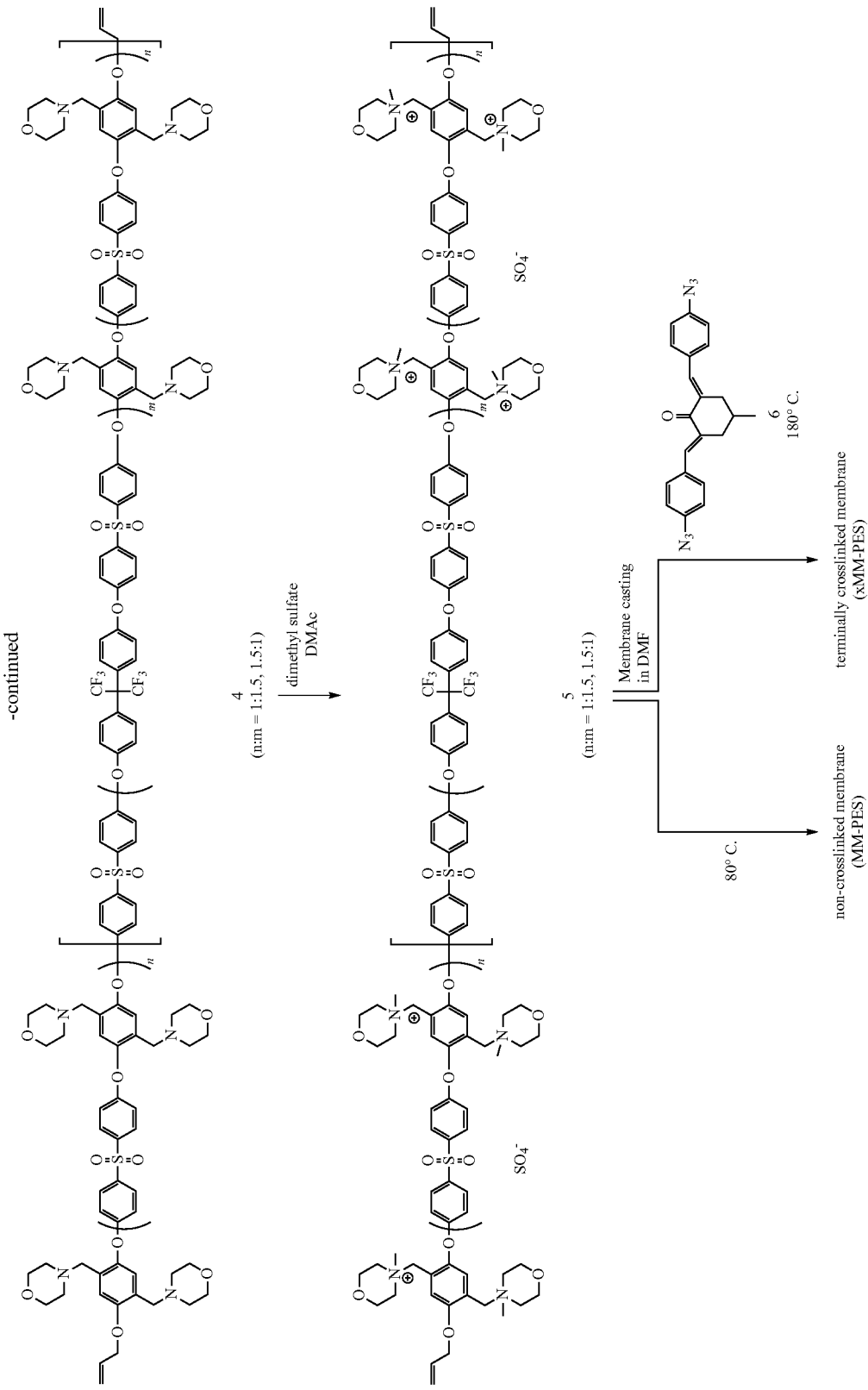

[Drawing 2] Synthesis processes for OH-terminated oligomer 1 and F-terminated oligomer 2

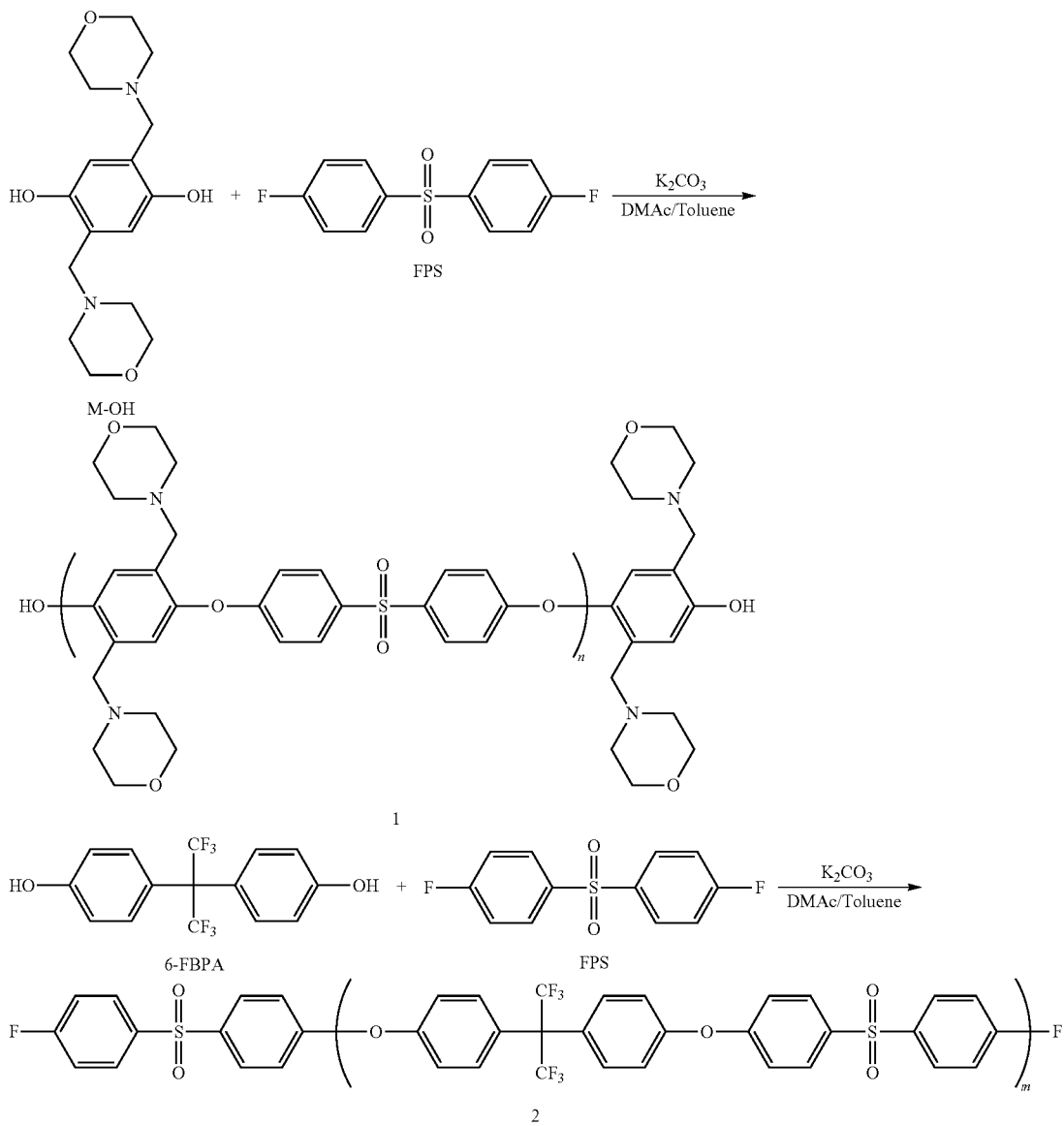

Using $^1$H NMR spectral analysis, the number of repeating units in OH-terminated oligomer 1 and F-terminated oligomer 2 was measured (FIG. 1).

As a result of comparing the intensity of $H_8$ (6.54 ppm), located at the end of the polymer chain, and the intensity of $H_3$ (7.13 ppm), the repeating units in OH-terminated oligomer 1 were determined to be 21 and 11. Moreover, as a result of comparing the intensity of terminal $H_5$ (7.18 ppm) and the intensity of $H_2$ (7.41 ppm), the repeating units in F-terminated oligomer 2 were calculated to be 13.

Next, multiblock copolymers 3 of two different hydrophilic (n):hydrophobic (m) compositions of 1:1.5 and 1.5:1 were synthesized by condensation polymerization between OH-terminated oligomer 1 and F-terminated oligomer 2 (Drawing 1).

Using a fairly excessive amount of OH-terminated macromonomer 1, a block copolymer having a terminal hydroxyl group which can be used for additional functionalization was obtained.

Figure 2:
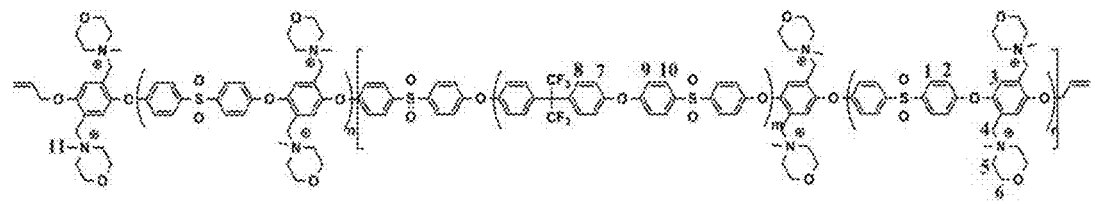
FIG. 2 displays $^1$H NMR spectra of (a) OH-PES 3 in $CDCl_3$; allyl-PES 4 in $CDCl_3$; and (c) allyl-MM-PES 5 in $d_6$-DMSO.
Figure 2:
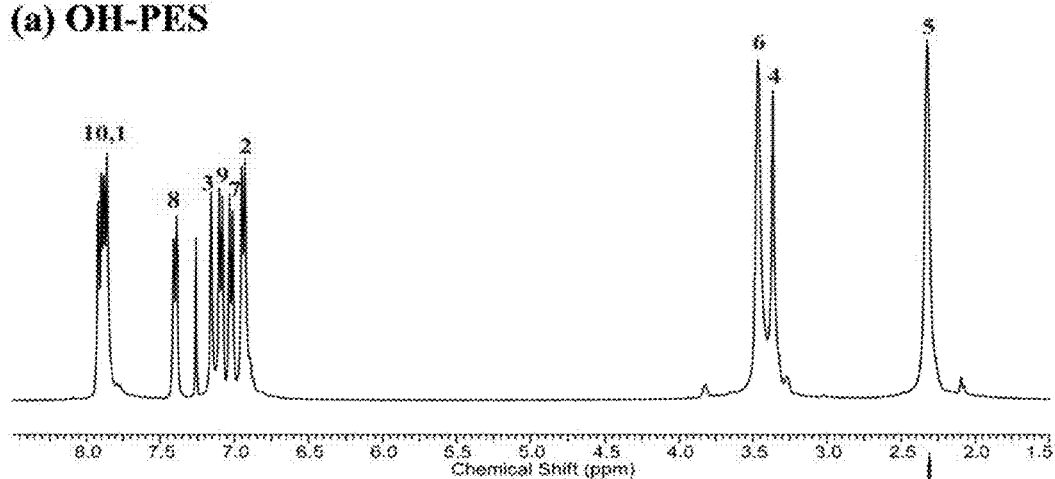
Figure 2:
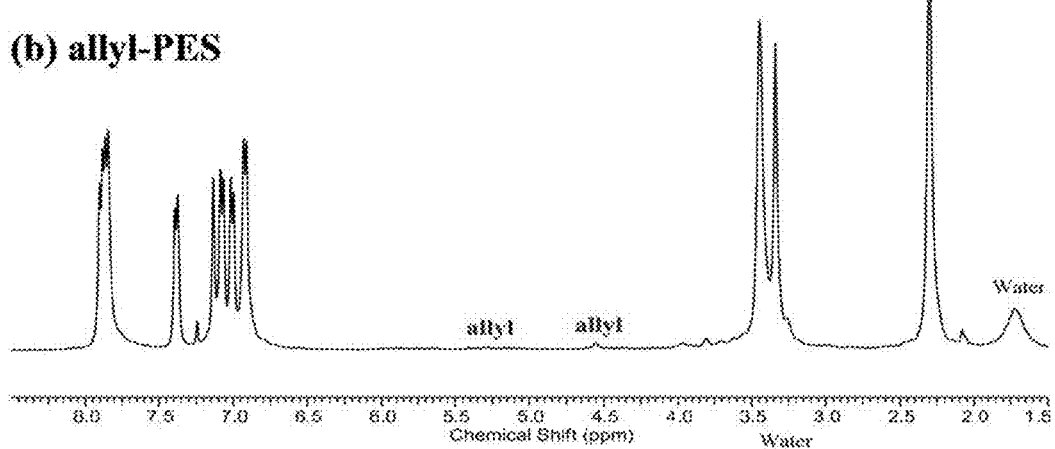
Figure 2:
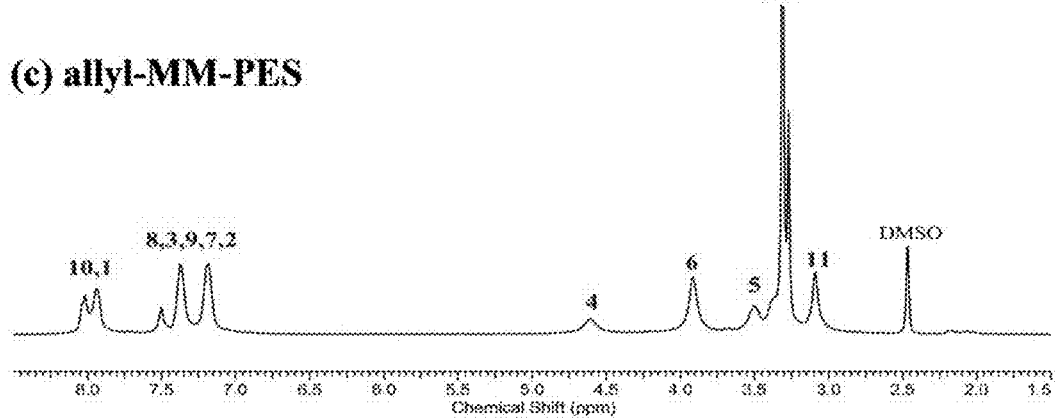

$^1$H NMR spectrum results showed all of the characteristic peaks corresponding to two types of hydrophilic and hydrophobic oligomer blocks, and the structure of OH-terminated multiblock copolymer (OH-PES) 3 was confirmed (FIG. 2a).

As a result of comparing the integration ratio of $H_8$ to $H_5$, a composition of 1:1.5 and 1.5:1 (hydrophilic:hydrophobic) was confirmed, and the respective polymers were termed OH-PES-1-1.5 and OH-PES-1.5-1. The two types of polymer 3 exhibited high molecular weights ($M_n$>46 kDa, confirmed by GPC), which supports the formation of a multiblock structure.

As a result of producing allyl-PES 4 through further allylation of terminal hydroxyl in polymer 3, and then methylating the allyl-PES 4, it was possible to obtain allyl-terminated methyl morpholinium-functionalized PES multiblock copolymers 5 of two different hydrophilic-hydrophobic compositions (allyl-MM-PES-1-1.5 and allyl-MM-PES-1.5-1) (Drawing 1).

In $^1$H NMR spectrum results, characteristic allyl peaks of allyl-PES 4 appeared at 5.4-5.3 ppm and 4.55 ppm (FIG. 2b).

Moreover, a new peak ($H_{11}$) appeared due to methylation of a morpholine group, and all adjacent peaks ($H_4$, $H_5$, and $H_6$) moved downfield. This occurred due to the increased negative electricity properties of the morpholine group, and confirms that a complete conversion into a methyl morpholinium group occurred in allyl-MM-PES 5.

(2) Preparation of Terminally-Crosslinked MM-PES Membrane

Using allyl-terminated MM-PESs 5 and bis(aryl azide) 6 as a crosslinking agent, terminally-crosslinked methyl morpholinium-functionalized PES membranes of two different hydrophilic-hydrophobic compositions (xMM-PES-1-1.5 and xMM-PES-1.5-1) were prepared.

Other than adding azide crosslinking agent 6 during film casting, non-crosslinked methyl morpholinium-functionalized PES membranes (MM-PES-1-1.5 and MM-PES-1.5-1) were prepared through the same method and used as a subject of comparison (Drawing 1).

Specifically, all of the membranes were prepared using a solution-casting method using a DMF solution including the corresponding polymer, and film thickness was adjusted using a doctor blade technique.

Terminally-crosslinked MM-PES (xMM-PES) membrane was obtained by adding 2,6-bis(4-azidobenzylidene)-4-methyl-cyclohexanone (15 wt % with respect to polymer 5) to a stirred DMF solution of morpholinium-functionalized PES block copolymer (10 wt % w/v).

Next, the solution was poured onto a clean glass plate, and the film was cast and dried in a vacuum oven at 80° C. for 12 hours.

Next, the film was thermally treated further in a vacuum oven at 180° C. for 12 hours.

A membrane was peeled off by immersion in deionized water, and the obtained membrane was immersed in 1 M NaOH for 48 hours at room temperature in a sealed container to obtain an OHF type membrane.

Prior to performing measurements, the obtained membrane was washed and immersed for 24 hours in deionized water.

Figure 3:
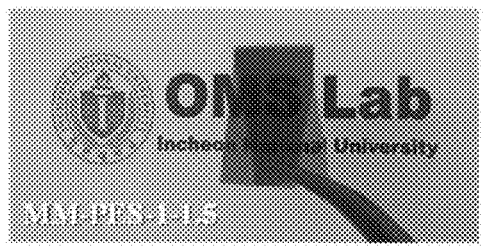
FIG. 3 displays photographs of non-crosslinked MM-PES and crosslinked xMM-PES membranes.
Figure 3:
Figure 3:
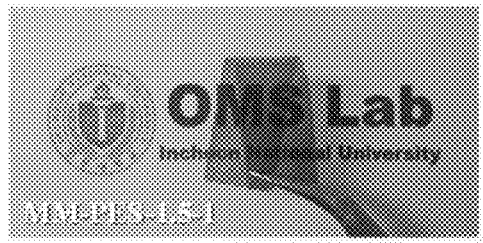
Figure 3:
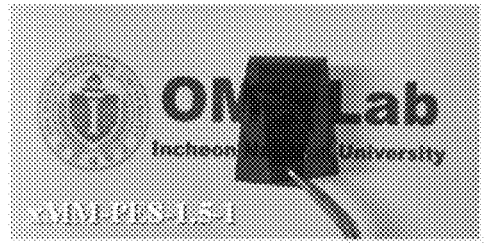

Experimental Examples (1) Analysis of Properties of Terminally-Crosslinked MM-PES Membrane Transparent and flexible crosslinked membranes (xMM-PESs) were obtained (FIG. 3), which did not dissolve in most organic solvents, including DMF, DMSO, and DMAc. Conversely, non-crosslinked membranes (MM-PESs) were easily dissolved in such solvents (Table 1).

Gel fraction (indirect measurement tool for crosslinking density) measurement results revealed a high crosslinking density, which indicates that a high degree of crosslinking is imparted to xMM-PES membranes even after crosslinking in which crosslinking only occurs at the ends of a PES polymer (Table 1).

TABLE 1

Solubility and gel fraction data for non-crosslinked MM-PES and crosslinked xMM-PES membranes

| Membrane | Solubility | | | Gel fraction(%) |
|---|---|---|---|---|
| | DMF | DMSO | DMAc | |
| MM-PES-1-1.5 | ○ | ○ | ○ | NA |
| xMM-PES-1-1.5 | X | X | X | 82.5 |
| MM-PES-1.5-1 | ○ | ○ | ○ | NA |
| xMM-PES-1.5-1 | X | X | X | 97.9 |

(○: soluble X: insoluble)

(2) Morphological Analysis

Figure 4:
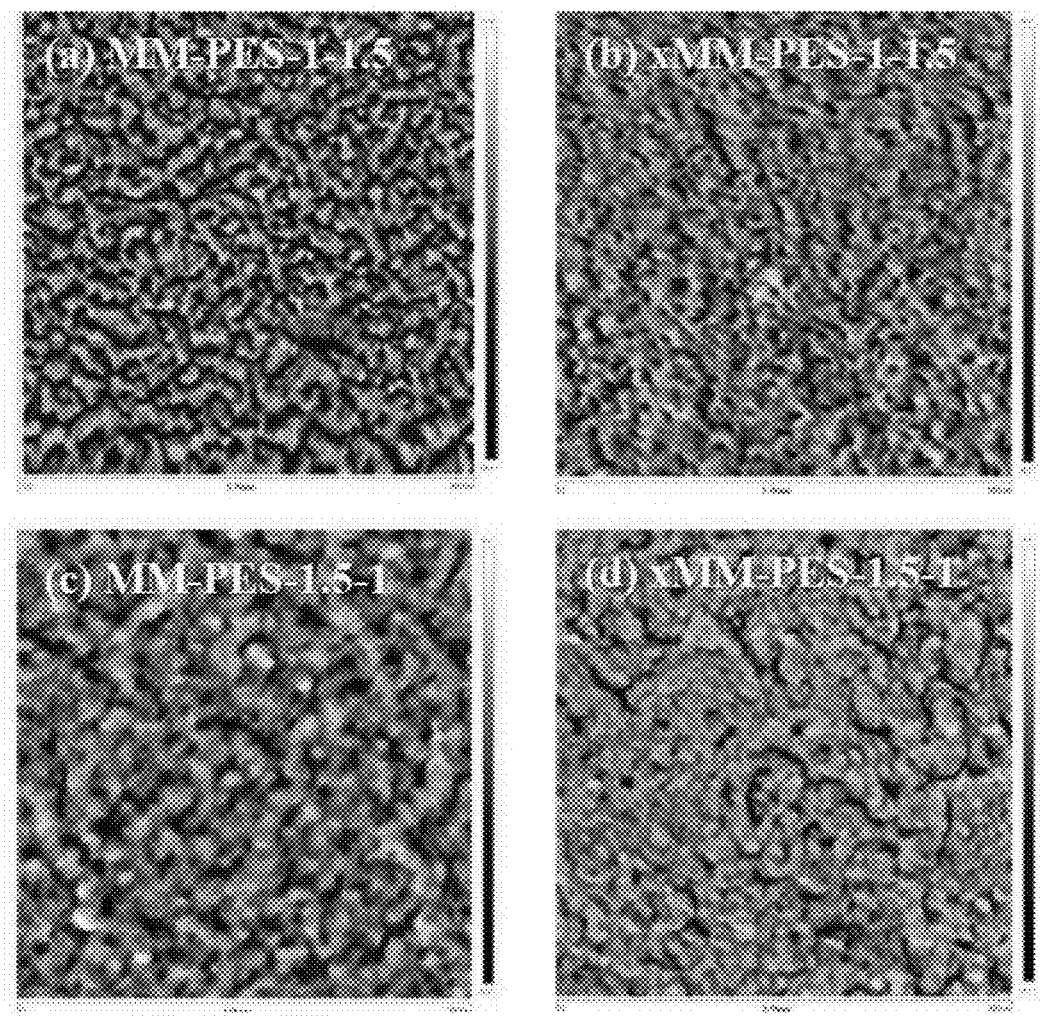
FIG. 4 displays AFM images of non-crosslinked MM-PES and crosslinked xMM-PES membranes.

Tapping mode atomic force microscopy (TM-AFM) images of crosslinked xMM-PES membranes (xMM-PES-1-1.5 and xMM-PES-1.5-1) and non-crosslinked MM-PES membranes (MM-PES-1-1.5 and MM-PES-1.5-1) were obtained at 20° C. (FIG. 4).

In all four types of membrane, phase separation was well observed between hydrophilic (dark regions) and hydrophobic (bright regions) blocks, which is a typical phenomenon for block ionomer, and indicates that the phase separation morphology of the block copolymer is maintained even after crosslinking.

As expected, due to a crosslinking network packed to a high density, the crosslinked membranes (xMM-PESs) exhibited narrower hydrophilic channels than the non-crosslinked membranes (MM-PESs).

Moreover, MM-PES-1.5-1 having a high hydrophilic block content, and the crosslinked membrane (xMM-PES-1.5-1) thereof, exhibited larger hydrophilic ion conductive channels than MM-PES-1-1.5 and xMM-PES-1-1.5, and thus can provide higher conductivity.

Figure 5:
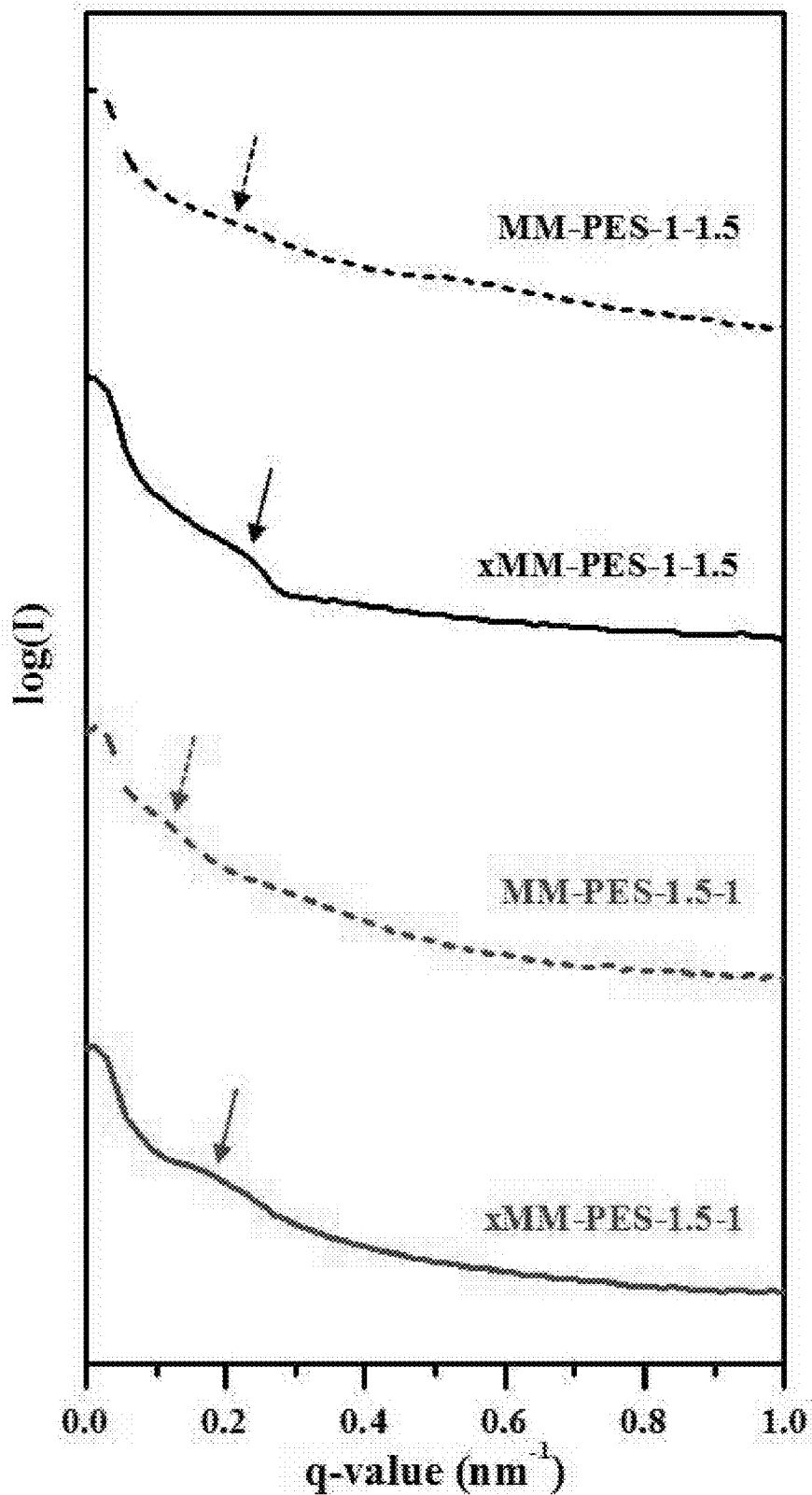
FIG. 5 displays SAXS patterns of MM-PES and xMM-PES membranes.

For additional morphological analysis of the four types of membrane, SAXS measurement was performed (FIG. 5).

Ionic domain spacing results calculated from first scattering peaks are displayed in Table 2.

A more distinct scattering peak was observed for the crosslinked xMM-PES membrane, which is due to polymer chain packing being enhanced by terminal crosslinking (that is, enhanced crystallinity).

Moreover, the crosslinked xMM-PES membrane exhibited smaller interdomain (d-) spacing than the non-crosslinked MM-PES membrane, which is related to the smaller free volume and to the lower conductivity resulting therefrom.

Meanwhile, the film having a highly hydrophilic composition exhibited a high d-spacing (27.6 nm and 26.0 nm, respectively, for MM-PES-1-1.5 and xMM-PES-1-1.5 and 58.5 nm and 35.3 nm, respectively, for MM-PES-1.5-1 and xMM-PES-1.5-1), which indicates an increase in conductivity.

TABLE 2

Scattering vectors and ion domain spacings (d-spacing) for MM-PES and xMM-PES membranes, calculated from SAXS data

| Membrane | Scattering ($nm^{-1}$) | d-spacing (nm) |
|---|---|---|
| MM-PES-1-1.5 | 0.23 | 27.6 |
| xMM-PES-1-1.5 | 0.24 | 26.0 |

TABLE 2-continued

Scattering vectors and ion domain spacings (d-spacing) for
MM-PES and xMM-PES membranes, calculated from SAXS data

| Membrane | Scattering (nm$^{-1}$) | d-spacing (nm) |
|---|---|---|
| MM-PES-1.5-1 | 0.11 | 58.8 |
| xMM-PES-1.5-1 | 0.18 | 35.3 |

(3) IEC and Hydroxide Conductivity Analysis

IEC is intimately related with ionic conductivity, and in most cases, conductivity improves with higher IEC values.

IEC values were measured for four types of membrane (non-crosslinked MM-PES-1-1.5 and MM-PES-1.5-1, and crosslinked xMM-PES-1-1.5 and x-MM-PES-1.5-1) using a reverse titration method (Table 3).

The results of calculating theoretical IEC values using the degree of functionalization matched well with experimental IEC values.

IECs of the non-crosslinked methyl morpholinium-functionalized PES membranes (MM-PESs) were 1.12 meq/g (MM-PES-1-1.5) and 1.43 meq/g (MM-PES-1.5-1).

In the case of the crosslinked xMM-PES membranes, somewhat lower values (1.09 meq/g for xMM-PES-1-1.5 and 1.42 meq/g for xMM-PES-1.5-1) were observed. This is considered to be due to the dilution of ion concentration caused by the presence of a crosslinking agent in the crosslinked polymer structure.

TABLE 3

IEC and conductivity data for non-crosslinked MM-PES and
crosslinked xMM-PES membranes

| | IEC (meq g$^{-1}$) | | OH$^-$ conductivity (mScm$^{-1}$) | | | |
|---|---|---|---|---|---|---|
| | Calculated | Measured | 20° C. | 40° C. | 60° C. | 80° C. |
| MM-PES-1-1.5 | 1.12 | 1.45 | 9.0 | 14.9 | 25.7 | 54.0 |
| xMM-PES-1-1.5 | 1.09 | 1.22 | 6.8 | 8.7 | 17.4 | 37.0 |
| MM-PES-1.5-1 | 1.43 | 1.69 | 19.6 | 31.2 | 53.4 | 78.3 |
| xMM-PES-1.5-1 | 1.42 | 1.40 | 15.0 | 23.9 | 40.5 | 73.4 |

Figure 6:
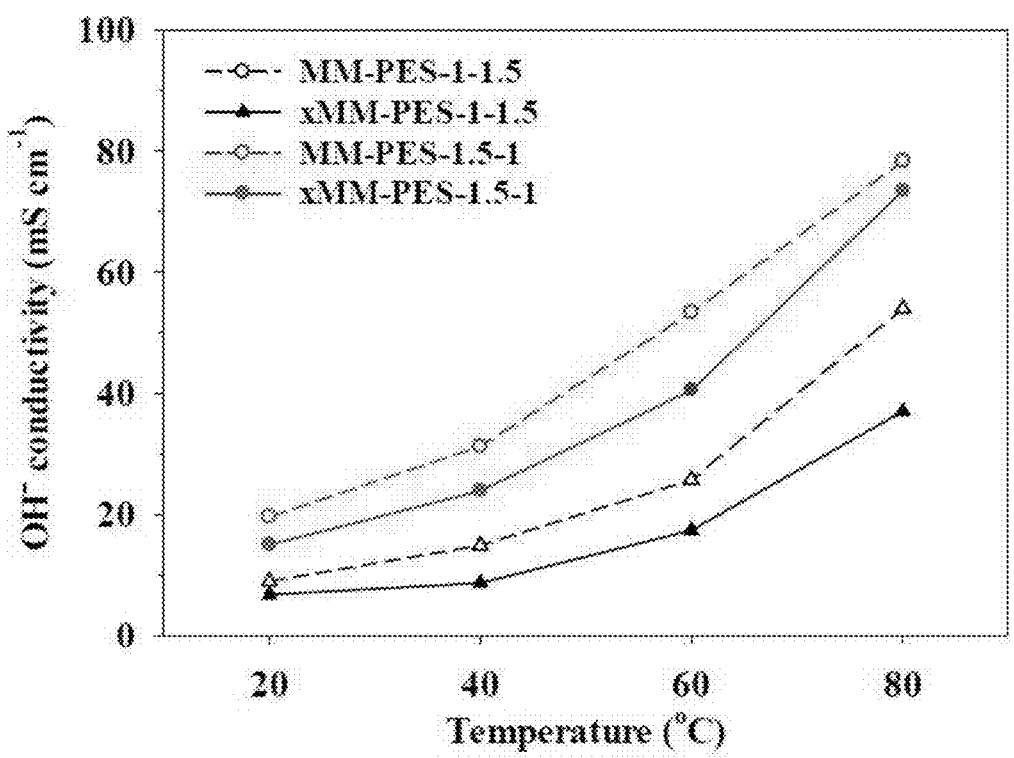
FIG. 6 is a conductivity vs. temperature graph for MM-PES and xMM-PES membranes.

Hydroxide conductivity was measured for all four types of membrane in water (liquid) in a temperature range of 20-80° C. (FIG. 6 and Table 3).

The methyl morpholinium-functionalized PES membranes of two different hydrophilic-hydrophobic compositions (MM-PES-1-1.5 and MM-PES-1.5-1) exhibited relatively low IEC values (1.45 meq g$^{-1}$) along with reasonably high conductivities (9.0 mS cm$^{-1}$ at 20° C., and 54.0 mS cm$^{-1}$ of higher at 80° C.).

The phase separation between hydrophilic and hydrophobic aggregates dues to the block structure and the easy dissociation of OH$^-$ ions originating from bulky morpholinium cations can provide an efficient ion transport path, and as a result, high conductivity can be imparted to the MM-PES membranes even at relatively low IEC values.

Moreover, as expected, the membranes (MM-PES-1.5-1 and xMM-PES-1.5-1) of highly hydrophilic compositions exhibited higher conductivities with temperature than MM-PES-1-1.5 and xMM-PES-1-1.5, and conductivity was reduced by crosslinking.

The IEC and conductivity tendencies all matched up with the morphological analysis results obtained from AFM and XRD.

However, even though conductivity decreased, it is important to focus on the point that the magnitude of the conductivity loss was not large, and this is due to formation of a crosslinking network being minimized by the unique terminally-crosslinked system of the inventive concept.

In particular, in the case of the crosslinked membrane (xMM-PES-1.5-1) of a highly hydrophilic composition, conductivity rapidly increases at temperatures of 60° C. or higher, and at 80° C., the crosslinked membrane (xMM-PES-1.5-1) exhibited a conductivity (73.4 mS/cm) nearly identical to that of the non-crosslinked membrane (MM-PES-1.5-1: 78.3 mS/cm).

In addition, the terminally-crosslinked membrane of a highly hydrophilic composition exhibits a high dependence on temperature.

In the crosslinked membrane, structural reorganization induced by hydrothermal energy causes phase separation to occur, which is considered to be accelerated in order to overcome the high activation energy for ionic conductivity at increased temperatures.

(4) Analysis of Water Uptake and Swelling Properties

The water uptake of four types of membrane (non-crosslinked MM-PES-1-1.5 and MM-PES-1.5-1, and crosslinked xMM-PES-1-1.5 and xMM-PES-1.5-1) was measured at 20° C. and 80° C. (Table 4).

The crosslinked membranes exhibited much lower water uptake values than the non-crosslinked forms thereof, due to the crosslinking network suppressing water uptake.

In the case of MM-PES-1.5-1, increased hydrophilic composition resulted in water uptake increasing sharply compared to MM-PES-1-1.5 at both low and high temperatures, but conversely, in the case of the crosslinked form (xMM-PES-1.5-1) thereof, water uptake did not increase significantly compared to the crosslinked membrane (xMM-PES-1-1.5) of a lower hydrophilic composition.

The terminally-crosslinked methyl morpholinium-functionalized PES membranes (xMM-PESs) exhibited higher conductivity and much lower water uptake values (especially at high temperatures (80° C.)), which indicates that the terminal crosslinking of the inventive concept alleviates water swelling without sacrificing ionic conductivity.

Therefore, the terminally-crosslinked methyl morpholinium-functionalized PES membranes (xMM-PESs) of the inventive concept can be ideal candidates for application in an AEMFC.

In particular, xMM-PES-1.5-1 having a highly hydrophilic composition exhibited a high conductivity of 73.4 mS/cm and a low water uptake of 26.1% at 80° C.

TABLE 4

Water uptake, swelling ratio, and λ value of MM-PES and xMM-PES membranes

| Membrane | Water uptake (%) | | Swelling ratio (%) | | | | λ | |
|---|---|---|---|---|---|---|---|---|
| | | | Δt | | Δl | | | |
| | 20° C. | 80° C. | 20° C. | 80° C. | 20° C. | 80° C. | 20° C. | 80° C. |
| MM-PES-1-1.5 | 12.6 | 21.4 | 8.2 | 12.6 | 3.4 | 7.4 | 4.8 | 8.2 |
| xMM-PES-1-1.5 | 8.5 | 13.6 | 5.1 | 7.8 | 3.3 | 6.8 | 3.9 | 6.2 |
| MM-PES-1.5-1 | 48.5 | 80.9 | 23.8 | 33.3 | 13.0 | 25.0 | 15.9 | 26.6 |
| xMM-PES-1.5-1 | 22.5 | 26.1 | 11.4 | 23.5 | 10.0 | 12.8 | 8.9 | 10.3 |

Moreover, the number of absorbed water molecules per portion of hydroxide conductor (methyl morpholinium group), that is, λ value, was calculated at 80° C. (Table 4).

The value for the terminally-crosslinked xMM-PESs (between 1.1 and 1.4 meq g$^{-1}$) of the inventive concept was compared with values for typical quaternary ammonium- and imidazolium-functionalized AEMs having similar IEC values.

Figure 7:
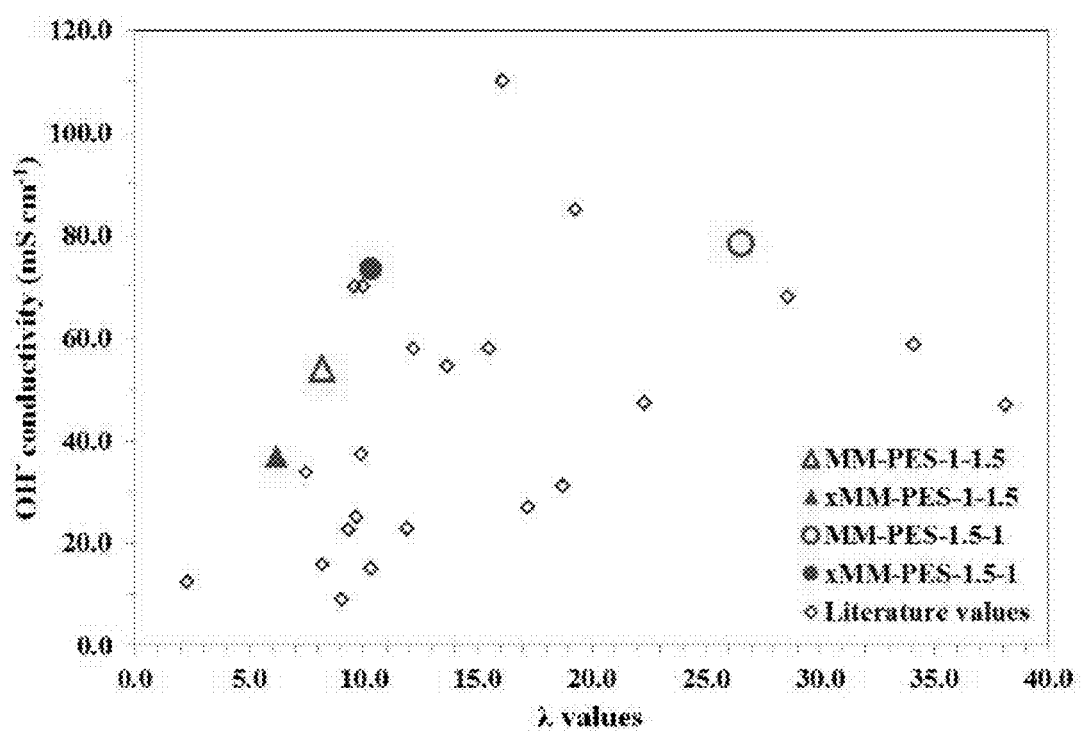
FIG. 7 is a graph illustrating the conductivities at 80° C. of MM-PES, crosslinked xMM-PES, and selected other ammonium- and imidazolium-functionalized AEMs as functions of λ value (absorbed water molecules per conductive group).

As seen in FIG. 7, at a given λ value, the terminally-crosslinked xMM-PES of the inventive concept exhibited much higher hydroxide conductivity than typical AEMs, which indicates that the terminally-crosslinked AEMs may be efficiently utilized for stimulating the transport of OH$^-$ by water.

Such a result clearly explains the reason why the terminally-crosslinked membrane of the inventive concept exhibits high conductivity even with a low water uptake value.

Moreover, the terminally-crosslinked membranes (xMM-PESs) of the inventive concept exhibited extremely low swelling behavior in both the in-plane (Δl) and through plane (Δt) directions, even at high temperatures (80° C.) (Table 4), which shows the high dimensional stability of the terminally-crosslinked system.

(5) Analysis of Thermal and Mechanical Stability

Figure 8:
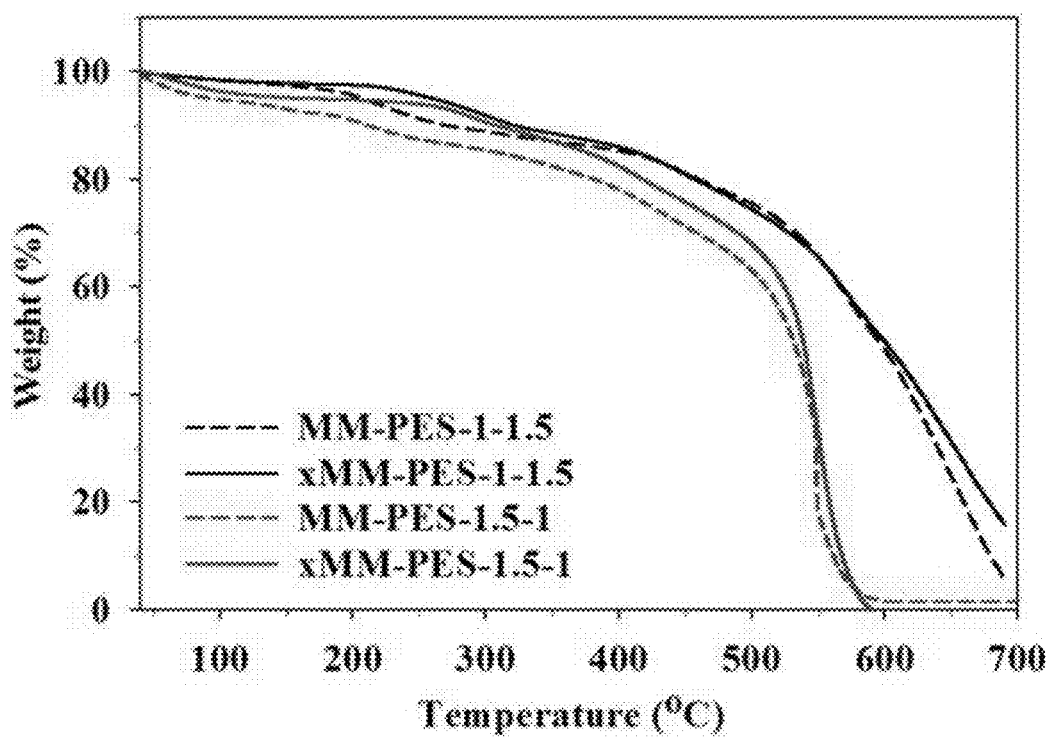
FIG. 8 is a TGA graph of MM-PES and xMM-PES membranes.

Using TGA techniques, the thermal stability and hydroxide forms of the four types of membrane were evaluated (FIG. 8).

The initial weight loss, which was about 6%, is considered to have mostly occurred due to evaporation of water contained in the membrane.

Next, each of the membranes exhibited a two-step weight loss behavior.

The weight loss starting at 187-195° C. (MM-PESs) and 228-261° C. (xMM-PESs) is due to decomposition of morpholinium groups, and the weight loss starting at 375-410° C. (MM-PESs) and 390-420° C. (xMM-PESs) results from degradation of polymer backbone.

Degradation of both conducting groups and the polymer main chain occurs at a higher temperature in the crosslinked membranes (xMM-PESs) than in the non-crosslinked membranes, which indicates that the thermal stability of the crosslinked membranes was increased.

Moreover, the AEMs must have a mechanical strength capable of withstanding the conditions in which fuel cells operate.

Accordingly, the mechanical properties of the four types of membrane were measured at 50% RH.

Figure 9:
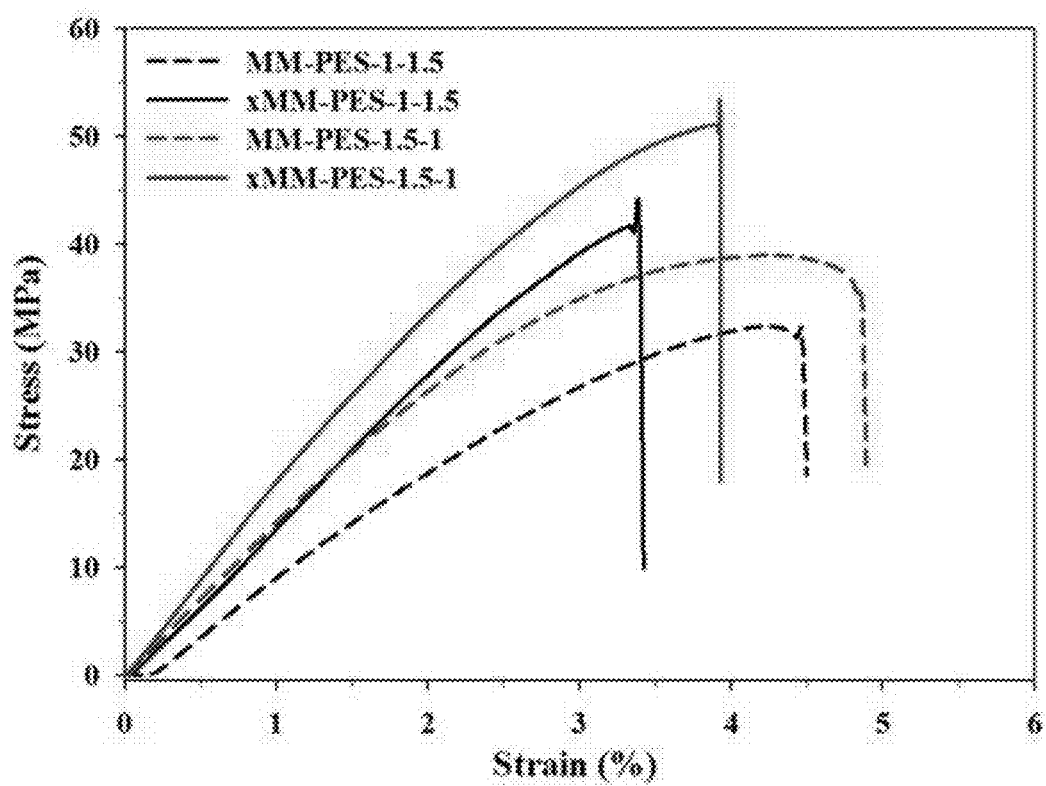
FIG. 9 displays stress-strain curves of MM-PES and xMM-PES membranes.

Crosslinking had an effect on the mechanical properties, and crosslinking enhanced the interaction between polymer chains, thereby increasing tensile strength and Young's modulus (FIG. 9 and Table 5).

Such results indicate that terminal crosslinking also enhances the mechanical properties of the corresponding membranes.

TABLE 5

Mechanical properties of MM-PES and xMM-PES membranes.

| Membrane | Tensile strength (MPa) | Elongation at break (%) | Young's modulus (GPa) |
|---|---|---|---|
| MM-PES-1-1.5 | 32.5 | 4.5 | 0.9 |
| xMM-PES-1-1.5 | 41.8 | 3.4 | 1.4 |
| MM-PES-1.5-1 | 38.9 | 4.9 | 1.4 |
| xMM-PES-1.5-1 | 51.0 | 3.9 | 1.7 |

(6) Water State Analysis

The terminally-crosslinked network also contributes to water retention between polymer chains, and to increasing the capacity thereof. Therefore, enhanced conductivity can be achieved even at low RH conditions.

For application in fuel cells, achieving high conductivity under partially hydrated RH conditions is especially important since in many cases, ionomers (AEMs or PEMs) only become hydrated through water vapor transported into a battery such as a gas fuel cell and the like.

Figure 10:
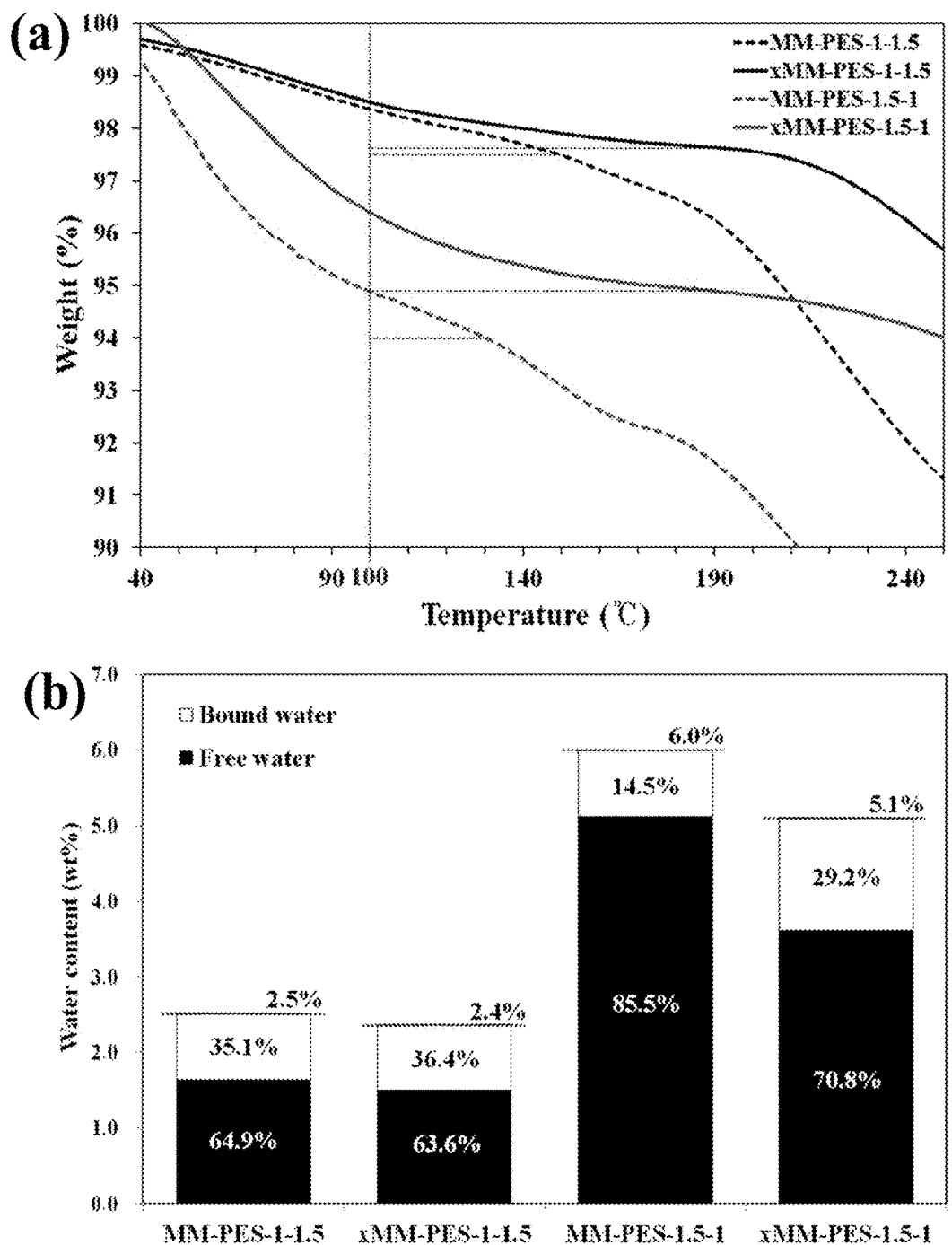
FIG. 10 displays (a) TGA thermograms of MM-PES and xMM-PES membranes; and (b) the relative ratios of bound water and free water in the overall water content of the membranes.

TGA thermograms of two types of crosslinked xMM-PES membranes (xMM-PES-1-1.5 and xMM-PES-1.5-1) having different hydrophilic-hydrophobic compositions were measured to examine the state of water in the membrane. In addition, the values for the two samples were compared to non-crosslinked membrane (MM-PES-1-1.5 and MM-PES-1.5-1) versions thereof (FIG. 10). TGA-based analysis of water molecule properties was limited to comparisons between samples, and quantitative analysis was excluded.

FIGS. 10a and 10b show the total water contents of the crosslinked xMM-PES membranes and non-crosslinked MM-PES membranes.

The values for the non-crosslinked membranes were 2.5 wt % (MM-PES-1-1.5) and 6.0 wt % (MM-PES-1.5-1), and the values were slightly lower for the crosslinked membranes (2.4 wt % for xMM-PES-1-1.5, and 5.1 wt % for xMM-PES-1.5-1).

In addition, the relative ratio of 'free water' with respect to 'bound water' in the overall water content of the membranes was analyzed from TGA graphs (FIG. 10b).

In the TGA graphs, the overall water content was calculated from the initial weight loss (about 6%).

Weight loss at or below 100° C. is due to 'free water' that does not interact with ion conductors, and in the non-crosslinked MM-PES membranes, the values thereof were 64.9% (MM-PES-1-1.5) and 85.5% (MM-PES-1.5-1) of the overall water content.

Meanwhile, weight loss at or above 100° C. corresponds to 'bound water' well bound through interaction with conductors, and the values thereof were 35.1% (MM-PES-1-1.5) and 14.5% (MM-PES-1.5-1).

It is necessary to note that after terminal crosslinking, the relative ratio of 'free water' decreased, and as a result, the amount of 'bound water' increased (FIG. 10b), which indicates that the terminal crosslinking of the inventive concept can efficiently hold water inside the polymer network.

As hydrophilic units increase, the water retention capacity of the crosslinked membranes is further enhanced, which is due to the level of increase in the amount of bound water being much higher in the case of xMM-PES-1.5-1 than in the case of xMM-PES-1-1.5 (35.1%→36.4% for xMM-PES-1-1.5, and 14.5%→29.2% for xMM-PES-1.5-1).

Figure 11:
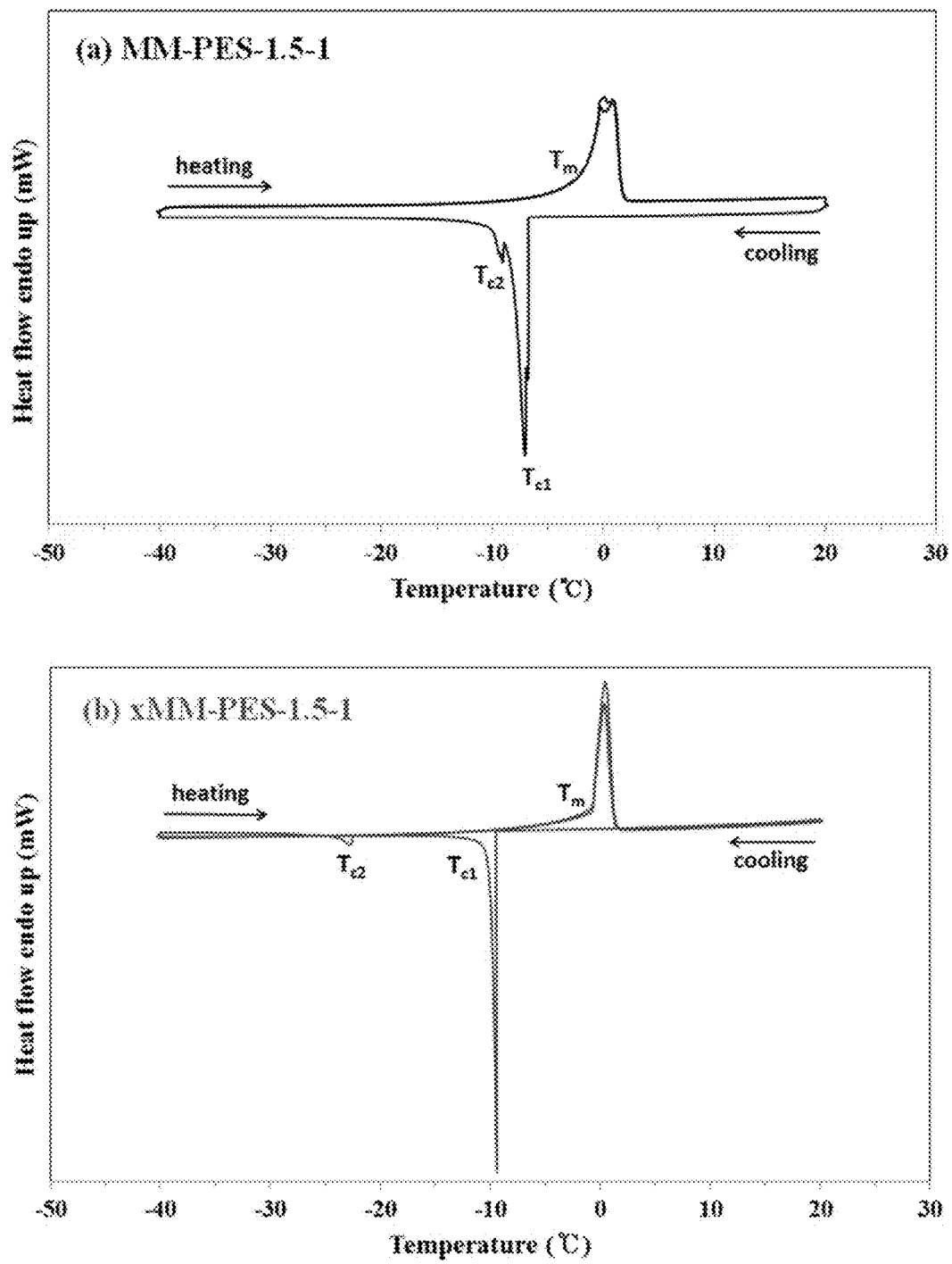
FIG. 11 displays DSC thermograms of MM-PES-1.5-1 and crosslinked xMM-PES-1.5-1 membranes.

Moreover, by performing DSC analysis on the crosslinked membrane (xMM-PES-1.5-1) of a highly hydrophilic composition, the effect of terminal crosslinking on enhancing water retention capacity was additionally examined, and the results thereof were compared to the case of the non-crosslinked membrane (MM-PES-1.5-1) (FIG. 11).

Typically, the state of water in the presence of a polymer membrane may be classified into the three types of 'free water', 'freezing bound water' and 'non-freezing bound water'.

A water molecule that is strongly bound to an ion conductor that exists in a polymer chain is defined as 'non-freezing bound water', and the phase transition peak thereof may be detected by DSC.

Water that undergoes a phase transition at or below 0° C. is 'free water' and 'freezing bound water' (or loosely bound water).

Both the non-crosslinked membrane (MM-PES-1.5-1) and the crosslinked membrane (xMM-PES-1.5-1) thereof, in completely hydrated states thereof, exhibited a phase transition peak ($T_m$) as water melted at about 0° C., and exhibited peaks ($T_{c1}$ and $T_{c2}$) as water crystallized below 0° C. Here, $T_{c1}$ the crystallization temperature for 'freezing bound water' and $T_{c2}$ is the crystallization temperature for 'freezing bound water'.

In the case of the crosslinked xMM-PES-1.5-1 membrane, both $T_{c1}$ (−9.4° C.) and $T_{c2}$ (−22.8° C.) were observed at a lower temperature than in the case of the non-crosslinked membrane (MM-PES-1.5-1: $T_{c1}$−7.1° C. and $T_{c2}$−9.1° C.).

Moreover, the amounts of 'free water' and 'freezing bound water' were calculated from the endothermic melting peak (melt enthalpy, $\Delta H_m$) area obtained from the DSC graph.

It is difficult to distinguish between 'free water' and 'freezing bound water' because the peaks corresponding to these two water states typically overlap. Therefore, for purposes of calculation, 'free water' and 'freezing bound water' were both considered to be 'freezing water'.

Next, the amount of 'non-freezing bound water' was calculated from the difference of the overall water content and the 'freezing water' content, and the overall water content was measured from water uptake analysis such as described above.

The results are summarized in Table 6, and once again, the ratio of well-bound water was much higher for the cross-linked xMM-PES-1.5-1 membrane (44.0%) than for the non-crosslinked membrane (MM-PES-1.5-1: 32.2%)

The DSC results matched up with the TGA analysis results. It was confirmed that formation of a terminally-crosslinked structure increases water retention capacity such that more water is trapped inside the crosslinking network, which suggests that the crosslinked membrane is capable of providing higher conductivity under partially hydrated low RH conditions.

TABLE 6

Analysis of water contents and ratios of each water state in MM-PES-1.5-1 and xMM-PES-1.5-1 membranes.

| Membrane | Water content(%) | | | Ratio(%) | |
| --- | --- | --- | --- | --- | --- |
| | Total | Freezing | Bound | [Freezing]/[Total] | [Bound]/[Total] |
| MM-PES-1.5-1 | 45.8 | 32.9 | 15.6 | 67.8 | 32.2 |
| xMM-PES-1.5-1 | 22.5 | 12.6 | 9.9 | 56.0 | 44.0 |

Figure 12:
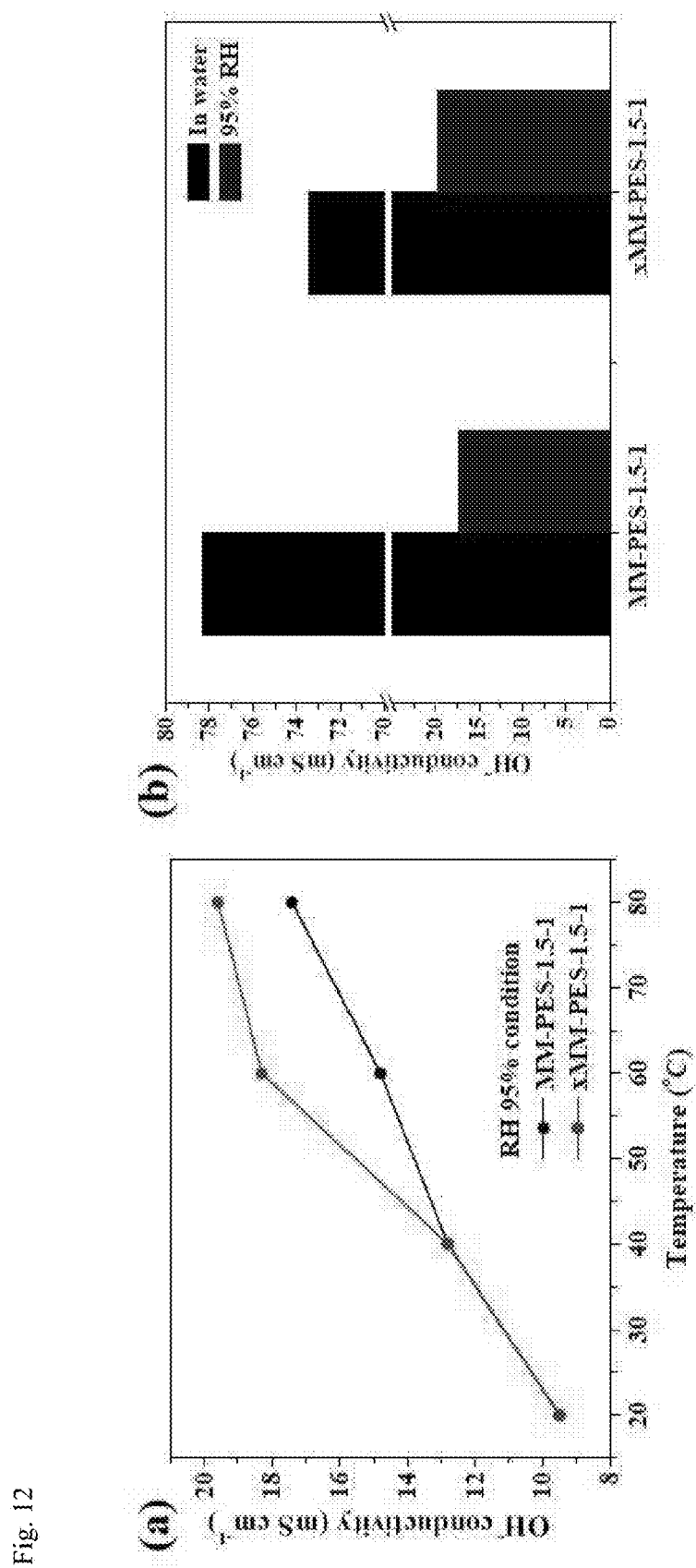
FIG. 12 displays (a) a conductivity vs. temperature graph for MM-PES-1.5-1 and xMM-PES-1.5-1 membranes at 95% RH; and (b) a graph comparing conductivities at 80° C. in 95% RH and water (liquid) conditions.

(7) Analysis of Hydroxide Conductivity Under Partially Hydrated Relative Humidity Conditions In order to examine ionic conduction properties at low humidity when the ratio of 'bound water' in the overall water content is high, the OH⁻ conductivity of the crosslinked xMM-PES-1.5-1 membrane was measured in conditions of 95% RH and 20-80° C. temperature, and the results thereof were compared with the case of the non-crosslinked membrane (MM-PES-1.5-1) (FIG. 12 and Table 7).

TABLE 7

Conductivities of MM-PES-1.5-1 and xMM-PES-1.5-1 membranes in RH 95% conditions and water (liquid)

| | OH⁻ conductivity(mScm$^{-1}$) | | | | |
| --- | --- | --- | --- | --- | --- |
| | 95% RH | | | | In water at |
| Membrane | 20° C. | 40° C. | 60° C. | 80° C. | 80° C. |
| MM-PES-1.5-1 | 9.5 | 12.8 | 14.8 | 14.8 | 78.3 |
| xMM-PES-1.5-1 | 9.5 | 12.8 | 18.3 | 19.6 | 73.4 |

The conductivities of the two membranes was equal up to 40° C. (9.5 mS/cm at 20° C. and 12.8 mS/cm at 40° C.), but at or above 60° C., the conductivity of the crosslinked membrane (xMM-PES-1.5-1) having the higher bound water ratio exceeded that of the non-crosslinked membrane (MM-PES-1.5-1).

The effects of the enhanced water retention capacity (confirmed by TGA and DSC data) resulting from terminal crosslinking and the thermally induced structural reorganization were combined such that the crosslinked xMM-PES-1.5-1 polymer exhibited high conductivity at increased temperature and partially hydrated 95% RH conditions.

(8) Analysis of Alkaline Stability

Figure 13:
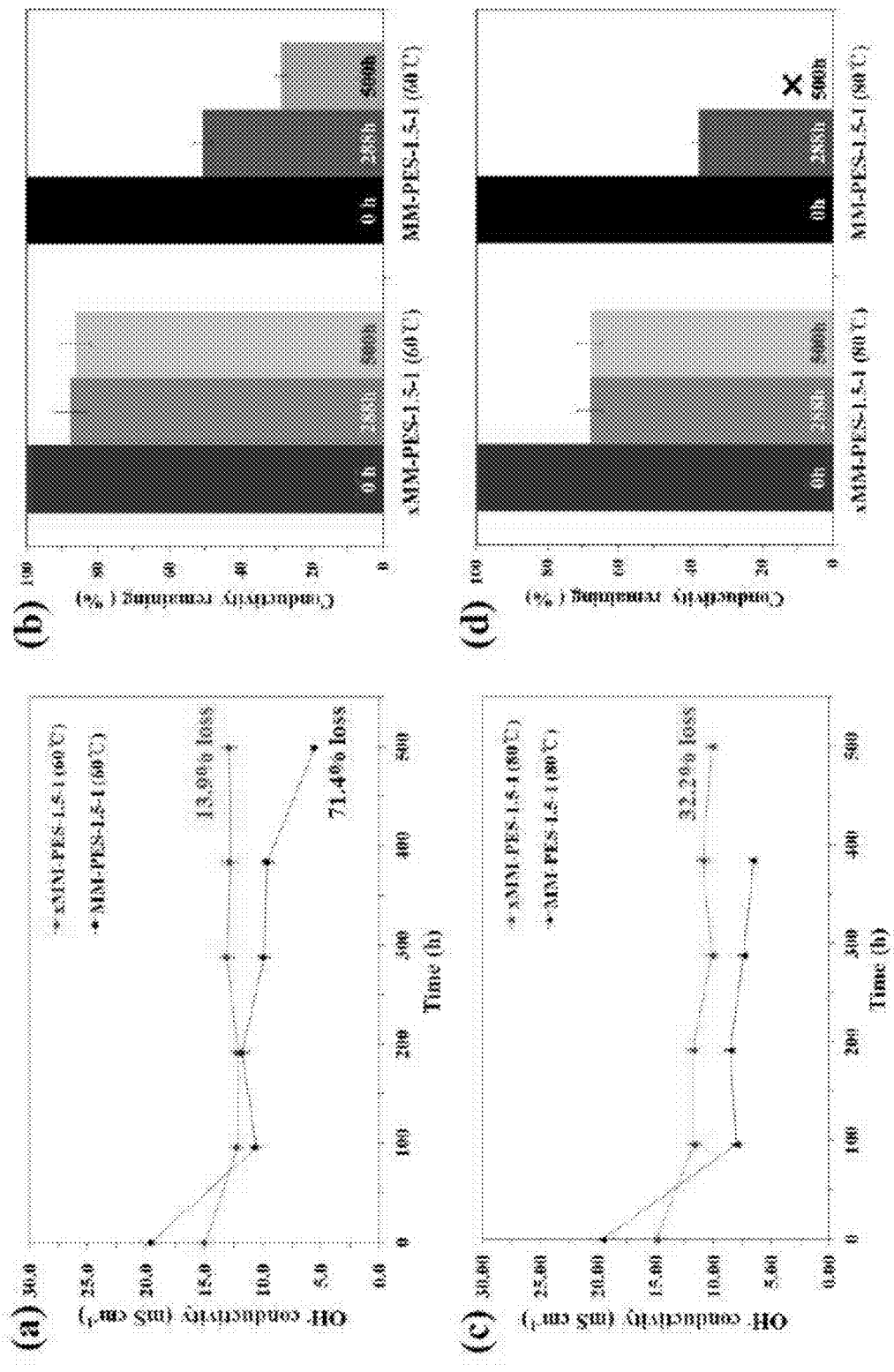
FIG. 13 displays graphs showing (a and c) the change in conductivity value; and (b and d) percent fraction of conductivity remaining for non-crosslinked MM-PES-1.5-1 (black) and crosslinked xMM-PES-1.5-1 (red) membranes following 500 hours of alkali treatment using 1 M NaOH at (a and b) 60° C. and (c and d) 80° C.

It was examined whether, in addition to excellent dimensional, thermal, and mechanical stability, the terminally-crosslinked membrane (xMM-PES-1.5-1) of a highly hydrophilic composition according to the inventive concept also had long-term durability against alkaline solutions. Specifically, the conductivity of the membrane was measured at 60° C. and 80° C. for 500 hours before/during/after immersion in a 1 M NaOH solution, and the results thereof were compared with the case of the non-crosslinked membrane (MM-PES-1.5-1). The change in conductivity was measured at 20° C. every 48 hours (FIG. 13).

In the case of the non-crosslinked MM-PES-1.5-1 membrane, after the membrane was maintained at 60° C., the conductivity rapidly decreased, and at higher temperature (80° C.), the decrease was more severe. Such a membrane exhibited a conductivity loss of about 71.4% after being stored for 500 hours at 60° C., and after being stored for 400 hours at 80° C., the membrane actually broke into pieces (FIG. 14).

Conversely, in the case of the crosslinked membrane (xMM-PES-1.5-1), a much smaller conductivity loss was observed.

Even after 500 hours, conductivity decreases of only 13.9% (60° C. storage) and 32.2% (80° C. storage) from the original conductivity occurred (FIG. 13), which indicates that the terminal crosslinking also enhances the chemical stability of the corresponding membrane.

Figure 14:
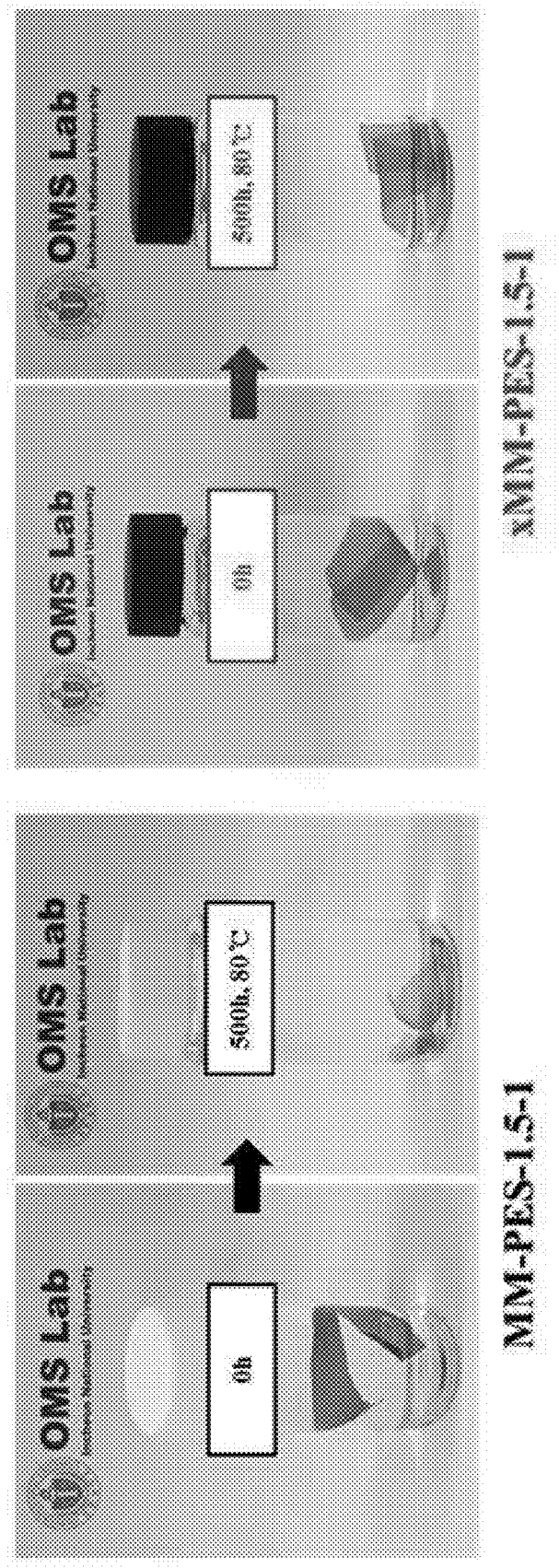
FIG. 14 displayed photographs of non-crosslinked MM-PES-1.5-1 and crosslinked xMM-PES-1.5-1 membranes following immersion in 1 M NaOH for 500 hours at 80° C.

Moreover, the crosslinked xMM-PES-1.5-1 membrane maintained its original appearance and flexibility even after being treated at 80° C. for 500 hours (FIG. 14).

Additional structural analysis was performed on the methyl morpholinium-functionalized membrane (MM-PES-1.5-1) of a highly hydrophilic composition, and on the crosslinked form (xMM-PES-1.5-1) thereof. Specifically, IR spectra thereof before/after treatment in high pH conditions for 500 hours were compared, and it was examined whether degradation of conducting groups and the polymer backbone occurred.

Figure 15:
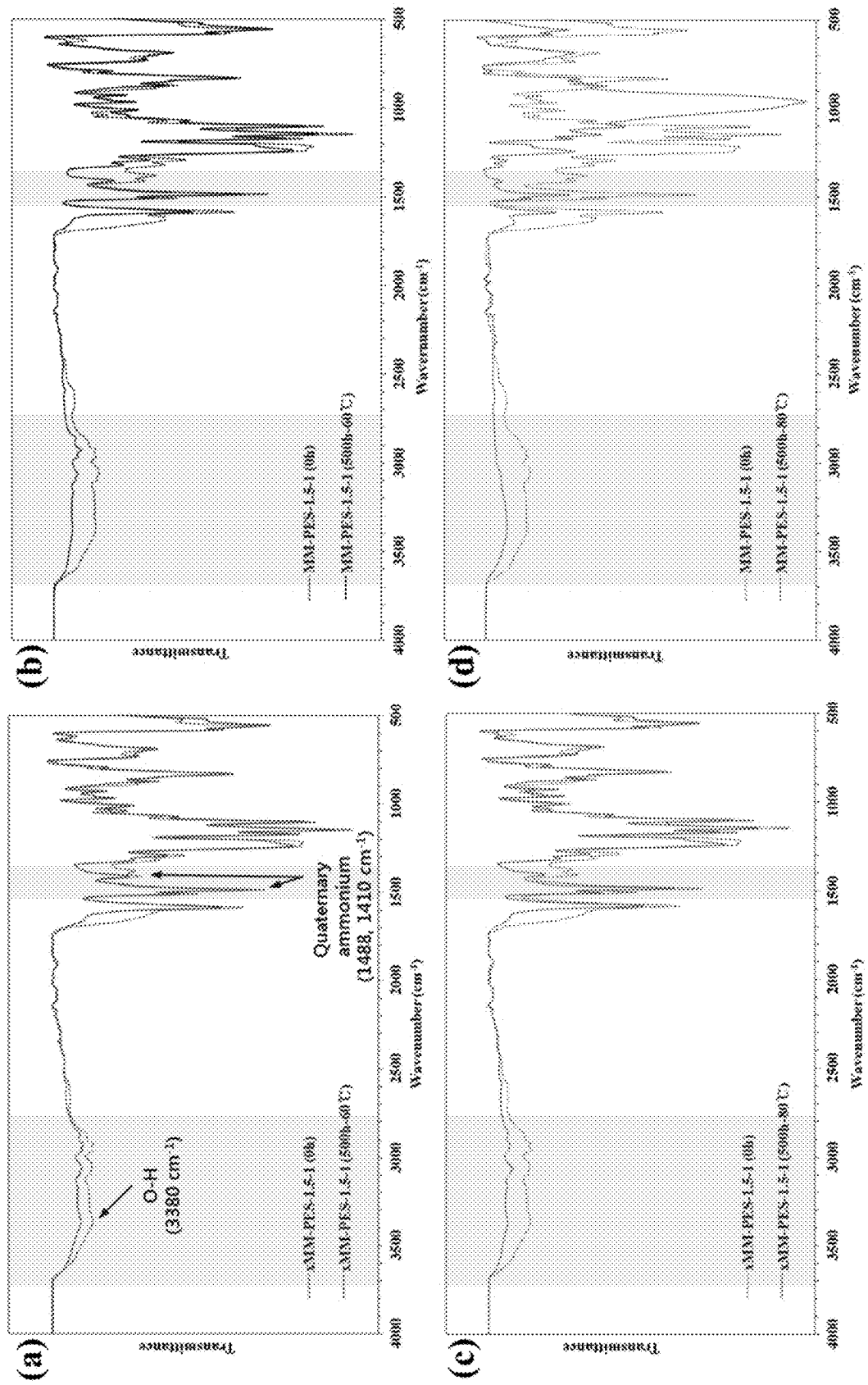
FIG. 15 displays FT-IR spectra of (a and c) crosslinked xMM-PES-1.5-1 membranes; and (b and d) non-crosslinked MM-PES-1.5-1 membranes prior to/following immersion in 1 M NaOH for 500 hours at (a and b) 60° C. and (c and d) 80° C.

As seen in FIG. 15, in the case of the crosslinked xMM-PES-1.5-1 membrane, after storage at 60° C. (FIG. 15a) and 80° C. (FIG. 15c), the intensities of the characteristic morpholinium peaks at 1488 cm$^{-1}$ and 1410 cm$^{-1}$ and the peak at 3380 cm$^{-1}$ corresponding to OH stretching decreased extremely slightly when compared to the original IR spectrum.

Other peaks (CO bond: 1240 cm$^{-1}$ and 1100 cm$^{-1}$; and S=O bond: 1290 cm$^{-1}$ and 1148 cm$^{-1}$) corresponding to the polymer backbone were maintained with almost no change, even after exposure in the alkaline solution, which indicates that the structural perfection of the crosslinked membrane was maintained.

Meanwhile, in the case of the non-crosslinked MM-PES-1.5-1 membrane, after the membrane was exposed to the basic conditions of 80° C. and 500 hours, unlike most of the peaks, whose intensities decreased very slightly at 60° C. (FIG. 15b), the intensities of peaks corresponding to the morpholinium and PES polymer backbone described above decreased sharply (FIG. 15d). Such results match up with results for flexibility (see FIG. 14) and conductivity (see FIG. 13) loss obtained in the same conditions.

Overall, the terminal crosslinking according to the inventive concept was capable of greatly enhancing the chemical stability of the membrane at both 60° C. and 80° C.

Examination of Results

In the inventive concept, novel anion exchange membrane (AEMs) based on terminally-crosslinked methyl morpholinium-functionalized poly(arylene ether sulfone) block copolymers (xMM-PESs) using an azide were developed for the first time.

By combining the advantages of bulky morpholinium conductors and a unique terminally-crosslinked polymer network in which crosslinking only occurs at polymer chain ends, the terminally-crosslinked AEMs according to the inventive concept were able to minimize conductivity loss even following crosslinking, while still significantly decreasing water uptake and enhancing the dimensional stability of the crosslinked membrane.

Moreover, terminal crosslinking also greatly increased the thermal, mechanical, and chemical stability of corresponding membranes.

The terminally-crosslinked xMM-PES membrane according to the inventive concept may be efficiently applied in stimulating the transport of OH$^-$ by water, and thus high conductivity was achieved at high temperatures, even with a low water uptake value.

In particular, the crosslinked xMM-PES-1.5-1 membrane having a high hydrophilic-hydrophobic composition exhibited a high ionic conductivity of 73.4 mS/cm and a low degree of water uptake of 26.1% at 80° C.

Moreover, the crosslinked xMM-PES-1.5-1 membrane, due to the enhanced water retention capacity, exhibited a higher bound water ratio than the non-crosslinked membrane (MM-PES-1.5-1), and this was specifically confirmed through TGA and DSC analysis. As a result, the conductivity of the crosslinked xMM-PES-1.5-1 membrane exceeded the conductivity of the non-crosslinked MM-PES-1.5-1 membrane in partially hydrated 95% RH and 60° C. or higher conditions.

Therefore, the terminally-crosslinked methyl morpholinium-functionalized xMM-PES membrane according to the inventive concept can be a very ideal membrane for AEMs.

A terminally-crosslinked polymer membrane according to the inventive concept may greatly increase the dimensional, thermal, mechanical, and chemical stability of the membrane while minimizing the decrease in conductivity caused by crosslinking.

Moreover, excellent conductivity may be additionally obtained due to the three-dimensional structure of morpholinium.

In particular, there is an advantage wherein high ionic conductivity and stability may be maintained particularly in high temperature and partially hydrated relative humidity (RH) conditions.

Moreover, there is an advantage wherein, by greatly reducing water uptake, swelling phenomena is effectively prevented while the water retention capacity is enhanced.

Furthermore, the terminally-crosslinked polymer membrane according to the inventive concept may be conveniently prepared by solution-casting and simple heat treatment.

Therefore, the terminally-crosslinked polymer membrane according to the inventive concept may be usefully adopted as an anion exchange membrane, for example, an anion exchange membrane (AEM) in an alkaline fuel cell.

What is claimed is:

1. A terminally-crosslinked polymer membrane characterized by being a polymer membrane (xMM-PES) obtained by crosslinking a methyl morpholinium-functionalized multiblock copolymer (MM-PES) represented by Formula 5 below (where n:m=1:1.5-1.5:1), wherein:
the MM-PES is crosslinked by an azide compound crosslinking agent represented by Formula 6 below; and
the crosslinking only occurs at ends of the MM-PES polymer chain,

[Formula 5]

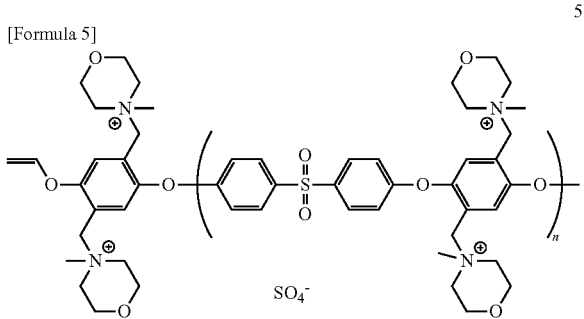

-continued

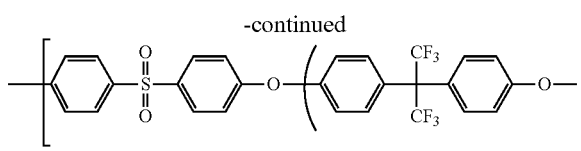

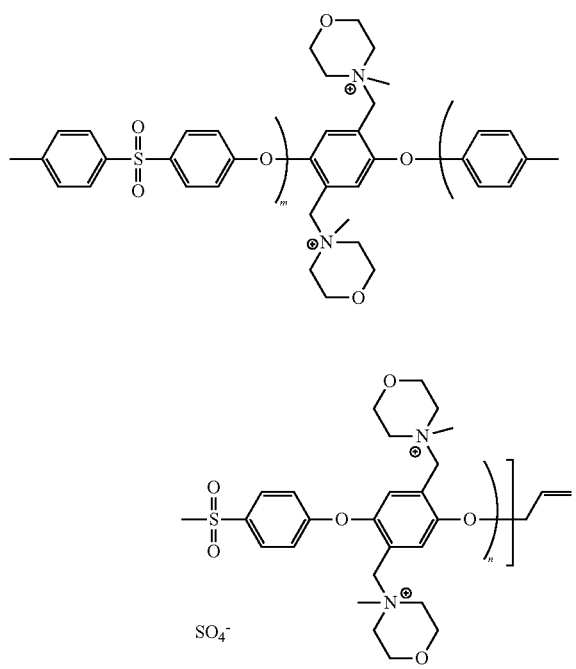

[Formula 6]

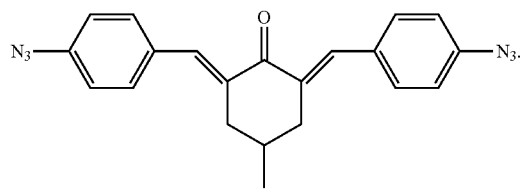

[Formula 5]

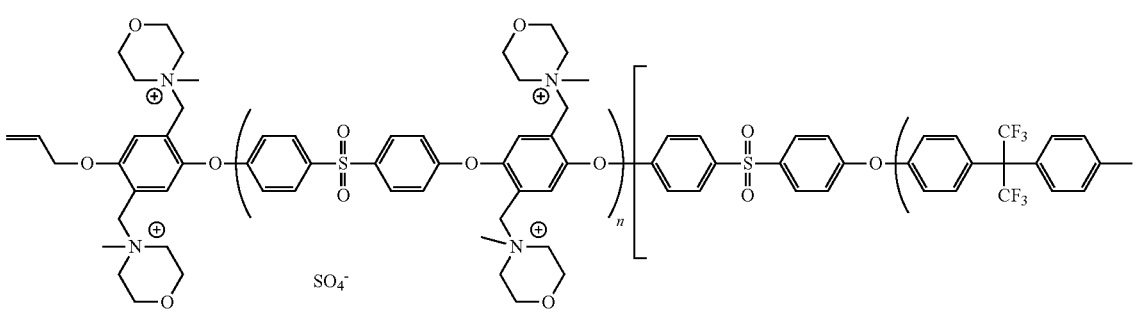

2. The terminally-crosslinked polymer membrane of claim 1, characterized in that the methyl morpholinium in the xMM-PES acts as a conducting group.

3. The terminally-crosslinked polymer membrane of claim 1, characterized in that the xMM-PES has a highly hydrophilic composition in which n:m is 1.5:1.

4. The terminally-crosslinked polymer membrane of claim 3, characterized in that the xMM-PES has a high conductivity under partially hydrated conditions, the OH⁻ conductivity measured at 60-80° C. and a relative humidity (RH) of 95% being higher than in the case of the non-crosslinked MM-PES.

5. The terminally-crosslinked polymer membrane of claim 1, characterized in that the azide compound crosslinking agent is used in an amount of 10-20 wt % based on the weight of the MM-PES.

6. The terminally-crosslinked polymer membrane of claim 5, characterized in that the azide compound crosslinking agent is used in an amount of 15 wt % based on the weight of the MM-PES.

7. The terminally-crosslinked polymer membrane of claim 1, characterized in that the terminally-crosslinked polymer membrane is used as an anion exchange membrane (AEM).

8. The terminally-crosslinked polymer membrane of claim 7, characterized in that the terminally-crosslinked polymer membrane is used as the anion exchange membrane (AEM) in an alkaline fuel cell.

9. The terminally-crosslinked polymer membrane of claim 1, characterized in that the terminally-crosslinked polymer membrane is applied in the field of water treatment, including electrodialysis and water purification filters.

10. A method for preparing the terminally-crosslinked polymer membrane (xMM-PES) according to claim 1, the method being characterized in that, after a solution is obtained by mixing a methyl morpholinium-functionalized poly(arylene ether sulfone) multiblock copolymer (MM-PES) represented by Formula 5 below (where n:m=1:1.5 to 1.5:1) and an azide compound crosslinking agent represented by Formula 6 below in a solvent, the obtained solution is cast into a film form and dried, and then the dried film is heat-treated to cross-link the polymer, -continued
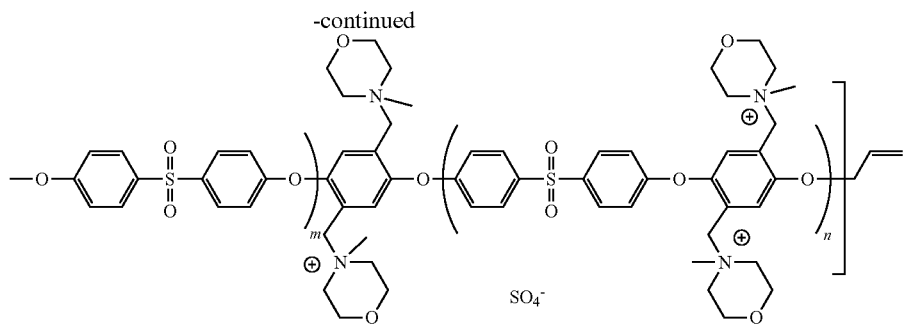
[Formula 6]
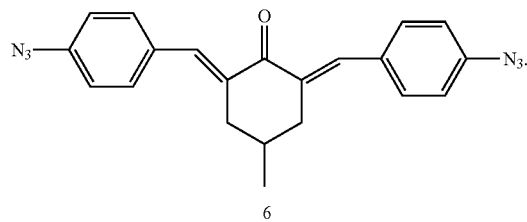
6
11. The method of claim 10, characterized in that the solvent is dimethylformamide (DMF).
12. The method of claim 10, characterized in that the heat treatment is performed at 170-200° C.
13. The method of claim 12, characterized in that the heat treatment is performed at 180° C.
* * * * *